United States Patent [19]

Weigel, Jr.

[11] Patent Number: 4,594,030

[45] Date of Patent: Jun. 10, 1986

[54] PNEUMATIC-HYDRAULIC DRILL UNIT

[75] Inventor: Matthew J. Weigel, Jr., Black Diamond, Wash.

[73] Assignee: The Boeing Company, Seattle, Wash.

[21] Appl. No.: 574,900

[22] Filed: Jan. 30, 1984

[51] Int. Cl.$^4$ .................. B23B 47/22; B23B 45/04; B23B 45/14

[52] U.S. Cl. ........................... 408/10; 173/19; 173/32; 408/130

[58] Field of Search ............... 408/14, 1 R, 130, 125, 408/10, 11, 76; 173/19, 32, 154

[56] References Cited

U.S. PATENT DOCUMENTS

| | | | |
|---|---|---|---|
| 2,209,949 | 8/1940 | McCormack | 192/61 |
| 2,390,620 | 12/1945 | Shapiro | 173/163 |
| 2,466,972 | 4/1949 | Slomer | 173/169 |
| 2,632,424 | 3/1953 | Slomer | 173/169 |
| 2,736,543 | 2/1956 | Slomer | 173/169 |
| 2,813,517 | 11/1957 | Sedwick | 173/170 |
| 2,857,789 | 10/1958 | Robinson | 408/130 X |
| 2,883,891 | 4/1959 | Shulters et al. | 408/130 |
| 2,884,902 | 5/1959 | Headings | 173/169 |
| 2,911,860 | 11/1959 | Winslow et al. | 408/111 X |
| 2,925,253 | 2/1960 | Long | 173/170 |
| 2,935,905 | 5/1960 | Winslow | 408/112 |
| 3,024,673 | 3/1962 | Winslow et al. | 408/112 |
| 3,141,509 | 7/1964 | Bent | 173/19 |
| 3,477,523 | 11/1969 | Lewis | 173/163 |
| 3,695,367 | 10/1972 | Catterfield et al. | 173/163 |
| 3,719,237 | 3/1973 | Flick | 173/12 |
| 3,726,348 | 4/1973 | Seegan | 408/130 X |
| 3,865,194 | 2/1975 | Chatfield, Jr. | 175/107 X |
| 3,930,776 | 1/1976 | Keller | 173/163 |
| 4,134,460 | 1/1979 | Klemm | 173/163 |
| 4,453,868 | 6/1984 | Winslow | 408/137 X |

Primary Examiner—Z. R. Bilinsky
Attorney, Agent, or Firm—Christensen, O'Connor, Johnson & Kindness

[57] ABSTRACT

A hand-held pneumatic-hydraulic drill unit employs modular drilling and clamp-up assemblies to perform a complete drilling cycle. The drilling cycle consists of: (1) clamping the drill unit to a work piece and/or a template that positions the drill unit relative to the workpiece; (2) advancing a rotating tool bit to perform the desired machining operation; (3) withdrawing the tool bit from the machined opening; and (4) releasing the clamping mechanism that secures the drill unit to the workpiece. The drill unit includes a pneumatic motor subassembly that is advanced toward and retracted from a workpiece by a hydraulically actuated feed cylinder. The motor subassembly and feed cylinder are axially aligned with one another. The clamp-up assembly of the drill unit also includes a clamp cylinder that is activated solely by hydraulic pressure. A modular, pneumatically actuated hydraulic pump is mounted on the drill unit and supplies pressurized hydraulic fluid to the feed and clamp cylinders. Variations in drilling depths, drilling speeds, feed rates, drilling thrusts, and clamp-up forces can be effected by changing modular components of the drill unit.

25 Claims, 19 Drawing Figures

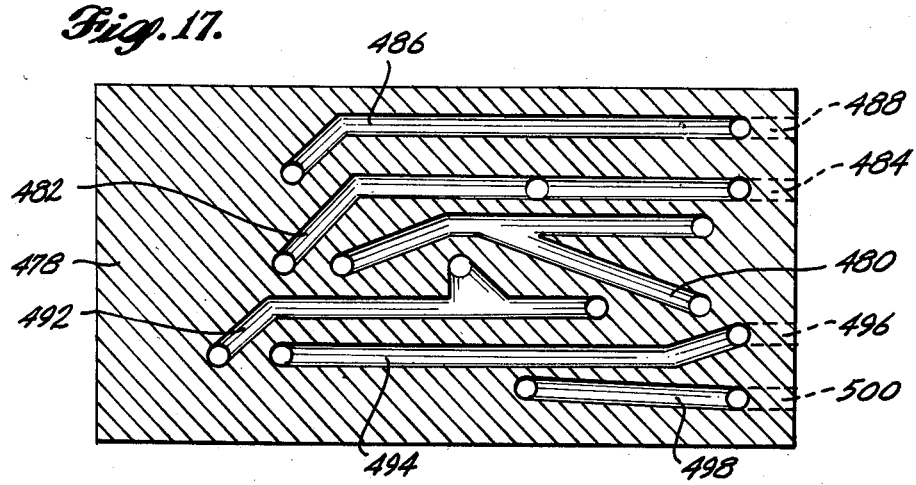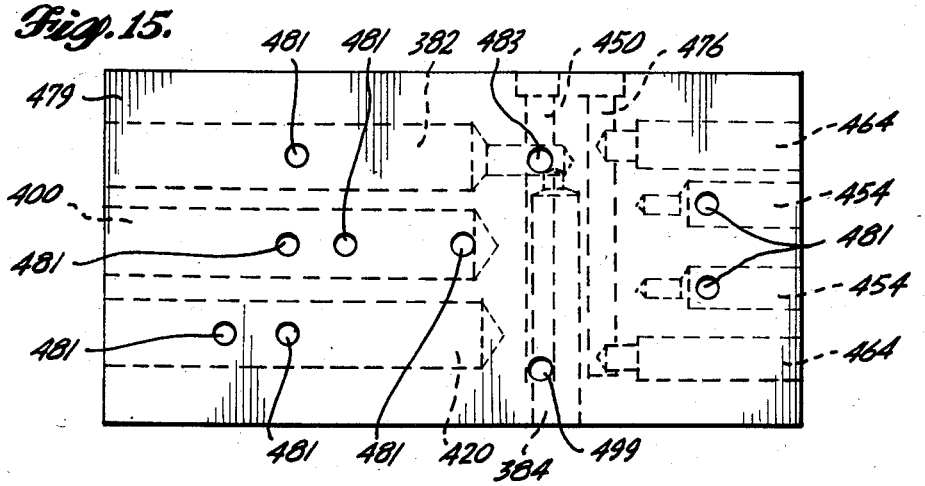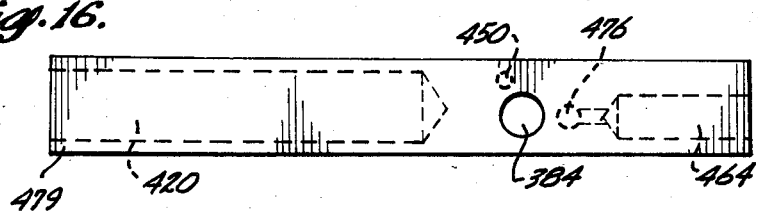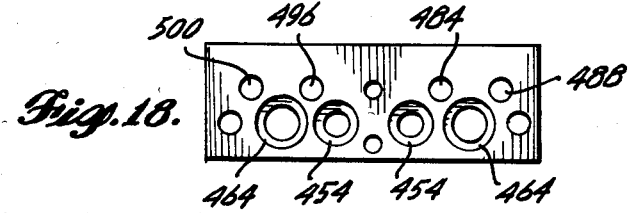

PNEUMATIC-HYDRAULIC DRILL UNIT

BACKGROUND OF THE INVENTION

This invention relates to portable power tools and, more specifically, to powered drilling apparatus of the type that executes an automatic drilling cycle consisting of: (1) clamping the drilling apparatus to the workpiece and, in most instances, to a template or jig that positions the drill spindle relative to the workpiece; (2) advancing or feeding a rotating tool bit (e.g., twist drill, countersink or combined twist drill-countersink) to effect the desired machining operation; (3) withdrawing the tool bit from the machined opening; and (4) releasing the clamping mechanism that secures the drilling apparatus to the workpiece.

Pneumatically operated, self-colleting, power feed drill motors of the above-mentioned type are presently utilized in the manufacture of various structural assemblies, being of particular importance in the drilling and counter-sinking of precision holes during the fabrication, maintenance, and repair of airframe assemblies, including conventional transport aircraft and space vehicles. As is known to those skilled in the art, such drill motors are generally clamped to the workpiece by means of a collet foot or base assembly that extends from the forward portion of the drill motor. An expansible collet that is alternatively located at a fixed position in the base assembly or mounted therein so as to be an adjustable distance from the position at which a twist drill (or other tool bit) is to contact the workpiece is operated by a mandrel that extends through the collet. The mandrel is in turn operated by an axially translatable drawbar that is connected to the piston of a pneumatic cylinder so that the collet expands and contracts as the drawbar is moved respectively away from and toward the base assembly.

In the most commonly employed manufacturing method, a thin metal template having openings that define the desired hole pattern is placed against a workpiece such as, for example, aircraft skin panels that are temporarily held in position against structural members of an aircraft wing, fuselage, or other such assembly or subassembly. The drill motor is then positioned so that the base assembly abuts the template with the collet extending through an opening in the template and through a previously-drilled hole in the workpiece. A shoulder or boss that circumferentially surrounds an opening through which the drill or tool bit will emerge is positioned within a second opening of the template. The power tool is then activated by squeezing a conventional trigger control on a pistol-grip type handle that extends from the drill motor and the pneumatic cylinder retracts the drawbar and mandrel so that the collet expands in the opening of the workpiece. This action insures that the base assembly remains against the workpiece and clamps the drill motor in the proper position. A pneumatic motor is automatically activated to drive the drill spindle via reduction gears and a second pneumatic cylinder drives the spindle so as to feed the rotating tool bit into the workpiece. During this portion of the sequence, a hydraulic control circuit maintains the feed rate at or within desired limits. When the outward extension of the spindle reaches a preset limit or stop position, the sequence is reversed to retract the tool bit and then move the mandrel away from the base assembly to allow the collet to contract so that the drill motor can be repositioned in a different opening of the template.

Although satisfactory in some situations, prior art drill motors of the above-described type exhibit several disadvantages and drawbacks. First, such drill motors are relatively large and heavy and because of such size and weight often cannot be utilized in limited quarters. Secondly, drill motors of the above-described type have remained a rather specialized tool with a single type of drill motor accommodating only a rather limited range of drilling depths, drill diameters, drilling speed and feed rate. Moreover, although an expansible collet that replaces the above-discussed base assembly adapts some prior art drill motors for use with precision drill jigs, prior art devices have not been adaptable to other manufacturing situations.

Another drawback and disadvantage of the prior art apparatus is that hydraulic pressure for the hydraulic control system has generally been provided by a gear-type pump that is driven by the same pneumatic motor that drives the drill spindle as well as the system feed and clamp cylinders. Because of this, the clamp-up force and feed thrust provided by prior art drill motors has not been as great as possible. Moreover, the gear-type pump of such a prior art unit is constantly driven throughout the entire period of time that the drill motor is actuated. Thus, both the pump and the pneumatically-driven motor are subject to substantial wear and maintenance. Moreover, driving the gear pump during the priod in which the workpiece is being drilled or machined in another manner can unnecessarily limit the torque produced by the drill motor. This can be especially important when a drill breaks through the workpiece, since stalling is then more likely to occur. In some cases if the drill motor stalls, hydraulic power may terminate and allow the drill motor to unclamp from the workpiece. Such unclamping can assert bending loads that break the drill bit and/or damage the hole that has been machined in the workpiece.

Additionally, the hydraulic control circuits utilized in the prior art drill motors to automatically sequence the tool through the steps of "clamp-up", drill thrust, drill retraction and unclamping, are relatively complex and are not as reliable as is often desired. In some cases, the requirements of the pneumatic drill motor reduce the clamp-up and thrust forces to a degree that results in hole elongation, drill breakage or other damage.

Accordingly, it is an object of this invention to provide a self-colleting, power fed tool that is relatively small in size and light in weight.

It is a further object of this invention to provide a lightweight automatic sequencing power tool that is readily adaptable to a relatively wide range of tool bit diameters, drilling depth requirements, drilling speeds, feed rates, drilling thrusts and clamp-up forces.

Still further, it is an object of this invention to provide a drill motor of the above-described type that is not limited to use with drill templates or jigs, but can be employed in a number of other manufacturing situations.

SUMMARY OF THE INVENTION

The foregoing and other objects are achieved in accordance with this invention by a pneumatic-hydraulic drill unit. In the basic embodiment, the drill unit includes a casing having a forward and rear end and an aperture extending longitudinally through the casing. A hydraulically actuated feed cylinder and a pneumatically actuated motor are configured to fit within the aperture in the casing. The feed cylinder is located adjacent the rear end of the casing and includes a piston and forwardly extending piston rod that move longitudinally within the feed cylinder. An extend chamber is formed rearward of the piston and a retract chamber is formed forward of the piston. A bore extends the length of the piston rod and passes rearwardly through the piston. The motor is attached to the forward end of the piston rod and receives pressurized air through the bore in the piston rod. The motor is moved between an extended and a retracted position when the piston in the feed cylinder is extended and retracted, respectively. A pump unit that is attached to the casing pressurizes hydraulic fluid for delivery to the feed cylinder through hydraulic valves and circuitry. The drill unit also includes pneumatic valves and circuitry for supplying pressurized air to the pump unit and the motor. Since this pressurized air is supplied from the primary air inlet source, the pneumatic drill motor does not affect the air supplied to the pump unit.

In the more detailed and currently preferred embodiments of the invention, the drill unit includes a hydraulically actuated clamp unit for clamping the drill unit to a workpiece. The clamp unit includes a hydraulically actuated clamp cylinder mounted to the rear of the drill unit and a foot mounted to the forward end of the drill unit for abutting a workpiece or a template attached to the workpiece. An expansible collet, which is operated by a mandrel that extends through the collet, extends forwardly through the foot. The mandrel is operated by an axially translatable draw rod that is connected to the clamp cylinder.

In a preferred embodiment, the pump unit includes a pneumatically actuated, pressure intensifying hydraulic pump having a piston member that reciprocates within a cavity in a pump housing. The piston member includes a pneumatic piston that has first and second hydraulic pistons extending longitudinally from either side of the pneumatic piston. The pneumatic piston is larger in diameter than the first and second hydraulic pistons and reciprocates within a pneumatic chamber in the cavity of the pump housing when pressurized air is introduced on each side of the pneumatic piston in an alternating fashion. The first and second hydraulic pistons reciprocate within first and second hydraulic chambers located on either side of the pneumatic chamber and pump hydraulic fluid from the first and second hydraulic chambers to the feed and clamp cylinders.

The valves of the drill unit include a trigger valve that is positioned between a source of pressurized air and the bore of the rod of the feed cylinder. The trigger valve is actuatable between a closed position that blocks the passage of air and an open position that allows the passage of air through the trigger valve. The drill unit valving also includes a four-way, two-position pneumatic valve called a frequency generator positioned between the source of pressurized air and the hydraulic pump that supplies air to the pneumatic chamber of the pump housing to cause the piston member to reciprocate. The frequency generator is mechanically coupled to the piston member of the hydraulic pump in an interactive manner so that when the piston member reciprocates, the frequency generator supplies pressurized air in an alternating manner to the pneumatic chamber on each side of the pneumatic piston; supplying pressurized air to the opposing sides of the pneumatic piston in an alternating manner in turn causes the piston member to move in a reciprocating fashion.

The valving of the drill unit also includes a four-way, two-position hydraulic valve that is positioned between the hydraulic pump and the feed and clamp cylinders. The hydraulic valve is actuatable between a first position wherein pressurized hydraulic fluid is supplied to the retract chamber of the feed cylinder causing the piston to retract, and a second position wherein pressurized hydraulic fluid is applied to the extend chamber of the feed cylinder causing the piston to extend. A spring pilot biases the hydraulic valve in its first position and an air actuated pilot moves the hydraulic valve from its first to its second position when pressurized air is supplied to the pilot. The air actuated pilot is in fluid communication with a retract valve that is mounted in the forward end of the casing. The retract valve initiates the actuation of valves to cause the motor to retract and also operates as a mechanical stop to limit the forward travel of the motor.

A pulse valve is positioned between the trigger valve and the portion of the pneumatic circuit consisting of the retract valve and the pilot of the hydraulic valve. The pulse valve is actuatable between a first position wherein the retract valve and pilot are in fluid communication with the trigger valve and a second position wherein the retract valve and pilot are isolated from the trigger valve. The pulse valve transmits a pulse of pressurized air to the retract valve and the pilot when the pulse valve is in its first position. A first pilot moves the pulse valve into the first position when the trigger valve is first actuated, and a second pilot moves the pulse valve into its second position a set time interval after the trigger valve has been actuated.

The drill unit also includes a sequence valve that is positioned between the hydraulic valve and the extend chamber of the feed cylinder. The sequence valve is actuatable between a first position wherein the hydraulic valve is not in fluid communication with the extend chamber and a second position wherein the hydraulic valve is placed in fluid communication with the extend chamber. The sequence valve includes a hydraulic pilot that moves the sequence valve into its second position when the hydraulic pressure reaches a predetermined percentage of the final value. This results in a time delay that insures that the drill unit is clamped to the workpiece before the feed cylinder begins to advance the motor and tool bit toward the workpiece.

In the preferred embodiment, the pulse valve and a portion of the pneumatic circuitry is housed within an air logic module that is mounted to the casing. A hydraulic logic module that also mounts to the casing contains the hydraulic valves and a portion of the drill unit hydraulic circuitry.

When the drill unit is to be used in a drilling operation, it is attached to a source of pressurized air. Upon supplying pressurized air to the drill unit, the hydraulic pump operates to establish the necessary hydraulic pressure to activate the feed and clamp cylinders. The collet of the drill unit is inserted into a hole that has been previously drilled in the workpiece, and the foot of the clamp unit is held against the workpiece or a template attached to the workpiece. When the tool bit of the drill unit is aligned with the location at which a hole is to be drilled, the trigger valve is actuated and pressurized air is supplied to the air motor causing it to rotate the tool bit. Actuation of the trigger valve also allows pressurized air to pass through the pulse valve and pressurize the retract valve and the pilot of the hydraulic valve, thereby moving the hydraulic valve into its second position which allows hydraulic fluid to pressurize the clamp and feed cylinders. After pressurization of the retract valve and the pilot, the pulse valve shifts into its second position, isolating the retract valve and pilot from the rest of the pneumatic circuit.

When the hydraulic valve is shifted into its second position, pressurized hydraulic fluid is directed to the clamp cylinder causing the collet to clamp to the inner surface of the hole into which it was inserted. Pressurized hydraulic fluid is simultaneously directed to the sequence valve. The sequence valve is actuated by its hydraulic pilot when a predetermined pressure is reached (i.e., after a time-delay) and allows hydraulic fluid to flow to the extend chamber of the feed cylinder. When the pressurized hydraulic fluid enters the extend chamber, the piston of the feed cylinder is urged forwardly, thereby advancing the motor and rotating the tool bit toward the workpiece. Once a hole has been formed in the workpiece, the motor contacts the retract valve. The retract valve is actuated to release pessurized air to the atmosphere, thereby releasing the pressurized air held in the circuit formed by the retract valve and the pilot of the hydraulic valve. When the pressure at the pilot is released, the hydraulic valve is moved back into its first position by the spring pilot to start the retract portion of the drilling cycle.

With the hydraulic valve in its first position, pressurized hydraulic fluid is directed to the retract chamber of the feed cylinder and the extend chamber of the clamp cylinder. The pressurized hydraulic fluid filling the retract chamber of the feed cylinder causes the feed cylinder to retract the motor and tool bit away from the workpiece. The pressurized hydraulic fluid supplied to the pilot-operated check valve of the clamp circuitry causes the collet to unclamp and allows the drill unit to be withdrawn from the workpiece, thus completing a drilling cycle.

BRIEF DESCRIPTION OF THE DRAWING

FIG. 15 is a cross-sectional view of the hydraulic module taken along section line 15—15 of FIG. 4;

FIG. 16 is a side elevation of the hydraulic module shown in FIG. 15;

FIG. 17 is a cross-sectional plan view of the hydraulic module taken along section line 17—17 of FIG. 4;

FIG. 18 is a side elevation view of the rear end of the hydraulic module; and,

DETAILED DESCRIPTION

Figure 1:
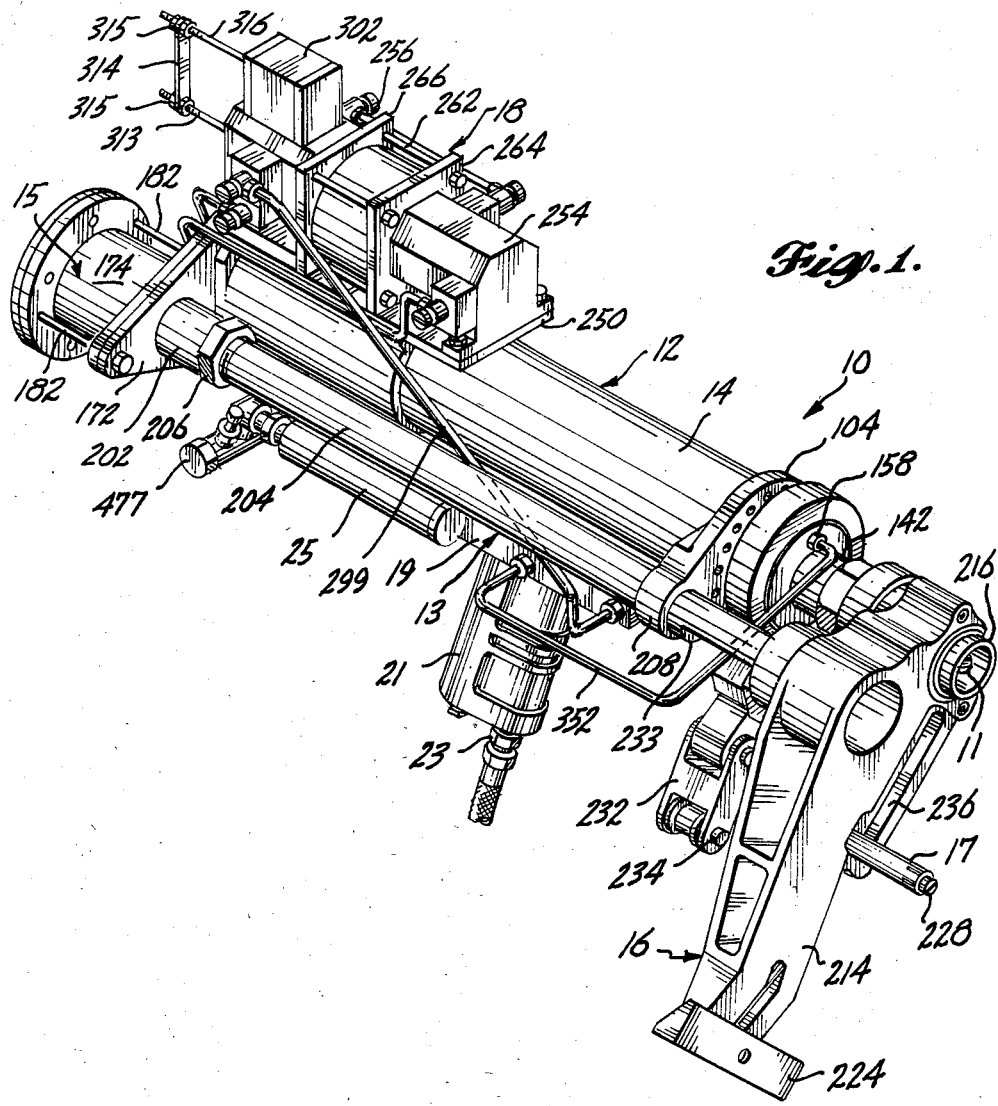
FIG. 1 is a perspective view of the drill unit, looking downwardly and rearwardly on the right side of the drill unit.

FIGS. 1, 2, 3, and 4 depict a pneumatic-hydraulic hand-held drill unit 10 that is constructed in accordance with this invention. When drill unit 10 is positioned for performing a drilling opration and is activated by an operator, the drill unit performs a complete drilling cycle that consists of: (1) clamping the drill unit to a template or workpiece; (2) advancing a rotating tool bit for drilling and/or countersinking; (3) retracting the tool bit; and (4) releasing the clamping mechanism. As shall be described in more detail hereinafter, drill unit 10 generally consists of two major mechanical subsystems, a drilling assembly 12 and a clamp-up assembly 13, that are arranged in a parallel, side-by-side arrangement. Drilling assembly 12 is housed within a casing 14 that forms a main portion of the body of drill unit 10 and performs a drilling and/or countersinking function. A hydraulically actuated feed cylinder 22 and a pneumatic drill motor subassembly 24 are axially aligned with one another and housed within casing 14. The feed cylinder 22 advances and retracts the drill motor 24 toward and away from the workpiece, respectively, as the drill motor rotates a tool bit 11. Clamp-up assembly 13, i.e., the portion of drill unit 10 that clamps the drill unit to the workpiece, includes a hydraulically actuated clamp cylinder 15 located at the aft end of drill unit 10 and a stabilizing foot 16 located at the forward end of the drill unit. A rod-like collet 17 extends forwardly through foot 16 and is inserted into a predrilled hole in the workpiece by the operator when drill unit 10 is initially positioned for a drilling operation. After collet 17 is inserted into the predrilled hole, drill unit 10 is actuated and clamp cylinder 15 causes the collet to clamp to the inner surface of the predrilled hole, thereby clamping drill unit 10 to the workpiece. At the completion of the drilling operation, collet 17 is unclamped to allow the removal of drill unit 10 from the workpiece.

A modular, pneumatically operated hydraulic pump 18, mounted on the upper surface of drill unit 10, supplies pressurized hydraulic fluid for the operation of the drill unit. Pressurized air is supplied to pump 18 through a pneumatic module 19 and the pressurized hydraulic fluid from pump 18 is routed through a hydraulic module 20 (FIG. 3) before passing to the other components of drill unit 10. Pneumatic and hydraulic modules 19 and 20 are mounted to the lower surface of casing 14. The sequence of operations performed by drilling assembly 12 and clamp-up assembly 13 during a drilling cycle is coordinated by the actuation of pneumatic and hydraulic valves located within pneumatic and hydraulic modules 19 and 20, respectively. A hydraulic reservoir 25, which is attached to the right side of hydraulic module 20, holds a supply of hydraulic fluid for the hydraulic circuit of drill unit 10. An operator holds drill unit 10 by a pistol-grip shaped handle 21 that extends downwardly from the lower surface of pneumatic and hydraulic modules 19 and 20. Pressurized air to power drill unit 10 is fed into the base of handle 21 through a pneumatic connector 23.

DRILLING ASSEMBLY

Figure 4:
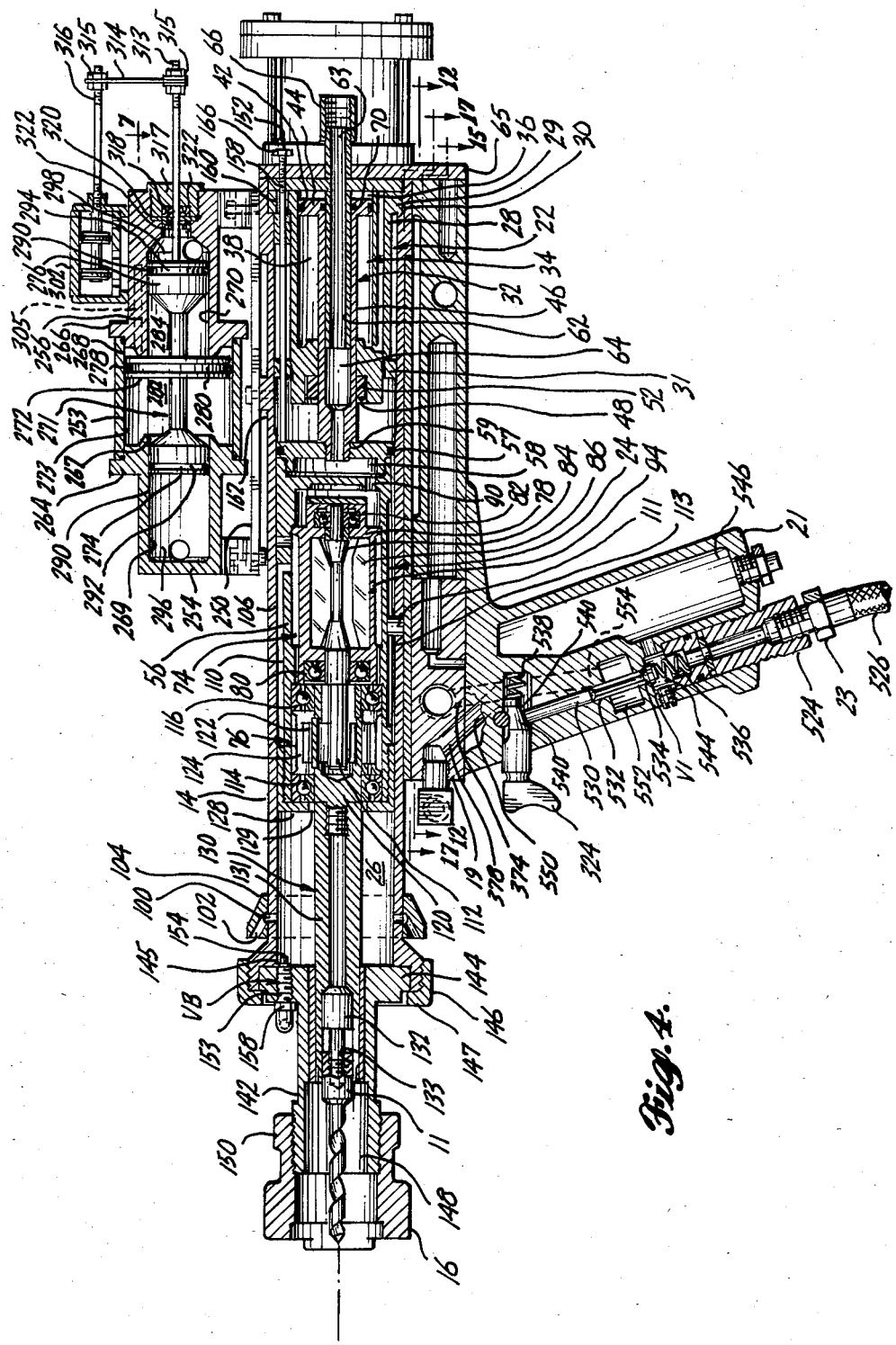
FIG. 4 is a cross-sectional, side elevation view of the drilling assembly of the drill unit.

Turning now to the more detailed structural aspects of drill unit 10, FIG. 4 illustrates a longitudinal section of drilling assembly 12. A cylindrically shaped casing 14 houses the major components of drilling assembly 12. A fixed, hydraulically actuated feed cylinder 22 is located at the rear of casing 14. Feed cylinder 22 advances and retracts an axially translatable pneumatic motor subassembly 24 located in front of the feed cylinder. Feed cylinder 22 and motor subassembly 24 are longitudinally aligned and connected to one another within a longitudinally oriented aperture 26 that passes completely through casing 14. The axial travel of motor subassembly 24, and thus, the drilling depth of a tool bit 11 is controlled by the stroke length of feed cylinder 22 and the adjustment of two internal stops as will be described in more detail later.

Feed cylinder 22 includes a cylinder 28 configured to fit coaxially within casing 14. The aft end of cylinder 28 has an annular, radially extending flange 29 that fits snugly within an enlarged inside diameter portion at the aft end of aperture 26. The forwardly facing surface of flange 29 abuts a rearwardly oriented shoulder 30 formed in casing 14, thereby preventing cylinder 28 from moving forward within the casing. The outside diameter of the forward portion of cylinder 28 is smaller than the inside diameter of aperture 26, an annular collar 31, coaxially surrounding the forward portion of cylinder 28, supports and aligns the cylinder within aperture 26.

Feed cylinder 22 also includes a piston 32 that moves axially within a cylindrical bore 34 in cylinder 28. Piston 32 includes a circularly shaped piston member 33 that separates bore 34 into an extend chamber 36 aft of the piston member and a retract chamber 38 forward of the piston member. A ring seal 42, positioned within a groove 44 formed circumferentially in the perimeter of piston member 33, keeps hydraulic fluid from leaking between extend and retract chambers 36 and 38 when either chamber is pressurized with fluid.

A tubular piston rod 46 is integrally formed with piston member 33 and extends forwardly from the piston member to pass through an aperture 48 in the forward end of cylinder 28. Piston rod 46 is dimensioned so that its forward end extends beyond the forward end of cylinder 28 when piston member 33 is in its rearmost position within bore 34. The rear portion of aperture 48 is sized for a close tolerance fit with the outside diameter of piston rod 46 so that the aperture supports piston rod 46 for sliding movement therein. The forward portion of aperture 48 holds an annularly shaped lip seal 52 that circumferentially seals piston rod 46 and prevents hydraulic fluid from leaking from the forward end of cylinder 28. The forwardmost end of piston rod 46 screws into the aft end of a housing 56 that is part of motor subassembly 24. Since piston rod 46 and housing 56 are connected, housing 56 is moved axially within casing 14 as piston 32 moves axially within cylinder 28.

A cylinder cap 60 abuts the rear surface of flange 29 and seals the aft end of cylinder 28. Cylinder cap 60 includes a circular portion 61 that fits within aperture 26 and a tubular extension 62 that is integrally formed with circular portion 61. Circular portion 61 is the same diameter as flange 29 and the rear surface of circular portion 61 is flush with the rearmost edge of casing 14. Tubular extension 62 extends forwardly and rearwardly from the center of circular portion 61 with an aperture 63 passing through the entire length of extension 62. The portion of extension 62 forward of circular portion 61 is slightly longer than bore 34 of cylinder 28. This forward portion of extension 62 is slidably received by a bore 64 that extends the length of piston 32. Since piston 32 can move relative to extension 62, pressurized air introduced into aperture 63 can flow into bore 64 of the piston while the piston is moving axially. This arrangement permits pressurized air to be supplied to motor subassembly 24 while the motor subassembly is urged forwardly by piston 32 of feed cylinder 22.

Figure 3:
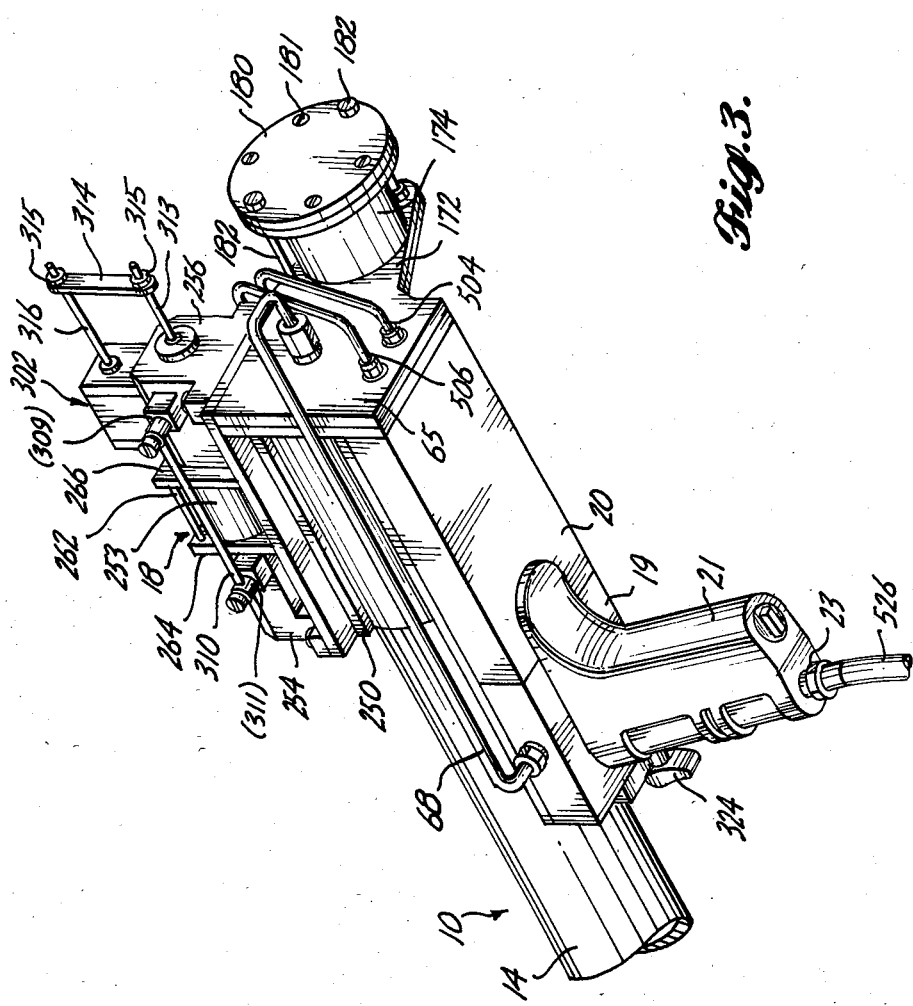
FIG. 3 is a partial perspective view of the drill unit, looking upwardly and forwardly at the left side of the drill unit.

The portion of extension 62 rearward of circular portion 61 extends rearwardly a short distance past the aft end of casing 14 and passes through a support plate 65. Support plate 65 is fastened to the aft end of casing 14 by bolts or other fasteners (not shown) and closes aperture 26. A pneumatic fitting 66 is screwed to the rearmost end of extension 62 outside of support plate 65 to receive pressurized air from pneumatic module 19 via an external line 68 (FIG. 3). Motor subassembly 24 receives pressurized air from pneumatic module 19 through fitting 66, through aperture 63 in extension 62, and through bore 64 in piston 32. An annular lip seal 70, mounted in the center of piston member 33, circumferentially seals the forward portion of extension 62 and prevents pressurized hydraulic fluid in extend chamber 36 from entering bore 64.

Because of the modular construction of drilling assembly 12, relatively rapid changes in drilling depth and drilling thrust can be accomplished. More specifically, since feed cylinder 22 can be readily installed and removed from casing 14, a major change in drilling depth requirements can be easily accommodated by installing a feed cylinder 22 having the appropriate stroke length. Additionally, to adjust the drilling thrust provided by drill unit 10 while keeping the size of pump 18 fixed, the diameter of piston 32 of feed cylinder 22 can be changed.

Continuing with a description of the structure of drilling assembly 12, motor subassembly 24 consists of a cylindrically shaped housing 56 that holds a conventional vane-type air motor 74 and a gear pack 76 located forward of the air motor. A circular rear cover 57 screws into the end of housing 56 to close off the aft end of the housing and receive the forward end of piston rod 46 that screws into the center of rear cover 57. A short, cylindrically shaped chamber 58 forward of rear cover 57 (between the rear cover and a partition 59) provides a connective passage for pressurized air flowing from bore 64 to air motor 74.

Air motor 74 is of conventional design and includes a motor shell 78 that is held coaxially within housing 56. Front and rear bearings 80 and 82, and a rotor 84 that is supported at its front and rear ends by front and rear bearings 80 and 82, respectively, are held within shell 78. Vanes 86 extend radially outward from rotor 84 and bear against the inner surface of shell 78.

Pressurized air supplied from bore 64 enters chamber 59, goes through a passage 90 formed in partition 58, and enters an inlet port (not shown) of air motor 74 to cause rotor 84 to rotate within shell 78. The air then exits air motor 74 through exhaust ports 94 in shell 78 and exits from housing 56. The air exiting housing 56 passes through vents 106 formed in the wall of the housing. Vents 106 open into longitudinally oriented grooves 110 formed on the outside surface of housing 56. Grooves 110 allow the exiting air to pass forwardly between the outer surface of housing 56 and the inner surface of casing 14, thus forming an air bearing-type cushion to reduce frictional contact between housing 56 and casing 14 as the air motor housing moves axially within the casing. Air exiting in this manner also cools gear pack 76 when drill unit 10 is being operated.

The air passes from grooves 110 into aperture 26; passes outwardly through a circumferential ring of holes 100 formed in the wall of casing 14; and continues on through a corresponding set of holes 102 in a muffler clamp 104 that is circumferentially mounted on the outer surface of casing 14 close to the forward end of the casing. The arrangement of holes 102 in muffler clamp 104 reduces the noise of air being exhausted from drill unit 10.

In the preferred embodiment, a guide plug 111, made from a material having a low coefficient of friction such as polytetrafluoroethylene, extends upwardly through the lower surface of casing 14 adjacent housing 56. The inner end of guide plug 111 rides in a slot 113 formed in the outer surface of housing 56. The arrangement of guide plug 111 and slot 113 prevents housing 56 from rotating within casing 14.

Moving on to a description of gear pack 76, the forward end of rotor 84 has a splined shaft 112 that extends forwardly through front bearing 80 into the central portion of the gear pack. Gear pack 76 is also of conventional design and is configured and arranged to reduce the output speed of rotor 84 and mechanically increase the torque provided to tool bit 11 used in the drilling operation. Gear pack 76 includes forward and aft bearings 114 and 116 that support each end of a longitudinally oriented spindle 120. Spindle 120 carries a pair of planetary gears 122 that are driven by shaft 112. A fixed, annularly shaped ring gear 124 that abuts the outer races of forward and aft bearings 114 and 116 engages gears 122, causing spindle 120 to rotate as shaft 112 drives gears 122. The forwardmost end of spindle 120 extends forwardly through an aperture 129 in an end cap 128 that screws onto the forward end of housing 56 and holds gear pack 76 and air motor 74 within the housing.

The modular construction of gear pack 76 and the manner in which the gear pack is held in housing 56 allows the drilling speed of drill unit 10 to be quickly changed. Specifically, by removing one gear pack and replacing it with a gear pack having a different gear ratio, the desired drilling speed can be obtained.

Continuing with a description of drill assembly 12, a two-piece arbor 130 is threadably engaged to the forward end of spindle 120 and is configured for receiving a tool bit 11. Arbor 130 includes a tubular shaft 131 that screws onto the forward end of spindle 120, and extends forwardly beyond the forward end of casing 14. The rear portion of a multi-diameter adapter 132 is press-fit and pinned into the forward section of shaft 131 to form arbor 130. The smaller diameter forward portion of adapter 132 has an external thread 133. The forwardmost end of adapter 132 is positioned approximately flush with the forwardmost end of shaft 131. A cylindrical space formed between the inner surface of shaft 131 and the outer surface of the forward portion of adapter 132 is sized to accept the body of an internally threaded tool bit 11.

A cylindrical nose piece 142 is fastened to the forward end of casing 14 to provide an attachment point for foot 16 and to also support arbor 130. A circular, radially extending flange 144 formed at the aft end of nose piece 142 abuts an annularly shaped forwardly facing shoulder 145 that is formed within the forward end of casing 14. Nose piece 142 is held against shoulder 145 by a cap nut 146 that screws onto the forward end of casing 14. Cap nut 146 has an inwardly directed, annularly shaped lip 147 that bears against the forward surface of flange 144. Arbor 130 is supported by the rear portion of an aperture 148 that extends the length of nose piece 142. An attachment nut 150 of foot 16 screws onto the forward end of nose piece 142.

The maximum axial distance that housing 56 of motor subassembly 24 can travel, and thus, the maximum drilling depth of drill unit 10, is controlled by the stroke length of feed cylinder 22. However, the fore and aft limits of travel of housing 56 can be shortened by adjusting the axial positions of a retract valve V8 and a stop pin 152 mounted at the front and rear ends of casing 14, respectively (FIG. 4). A cylindrical retract valve V8 is externally threaded and is screwed into a hole 153 that passes through flange 144 of nose piece 142. Retract valve V8 is part of the pneumatic control circuit of drill unit 10 as will be described in more detail later. The body of retract valve V8 projects rearwardly from flange 144 into aperture 26 of casing 14, and a spring-biased plunger 154 that is used to actuate retract valve V8 extends rearwardly from the body of the retract valve. When housing 56 moves forwardly within casing 14 and approaches retract valve V8, the forward surface of end cap 128 depresses plunger 154 until the forward motion of housing 56 is stopped when end cap 128 contacts the body of retract valve V8. By screwing retract valve V8 into or out of flange 144, the forward limit of travel of housing 56 can be adjusted, thereby establishing the countersink depth of a combination drill/countersink or countersink tool bit. A lock nut 155 secures retract valve V8 to flange 144 once the retract valve has been positioned axially.

The rear limit of travel of housing 56 is set by adjusting a rod-like stop pin 152 that is substantially parallel to the longitudinal axis of casing 14 within aperture 26. The rear portion of stop pin 152 is externally threaded and screws into support plate 65. Stop pin 152 extends forwardly from support plate 65 through a hole 158 in cylinder cap 60, a hole 160 in flange 29, and a hole 162 in collar 31. The forward end of stop pin 152 terminates at a point forward of the front end of feed cylinder 22, where it abuts the aft end of housing 56 when the housing is in its rearmost position. Stop pin 152 extends rearwardly past support plate 65 to permit external adjustment of its axial position. A transverse slot (not shown) in the rearmost end of stop pin 152 is sized to accept the blade of a screwdriver or other tool that can be used to screw the stop pin forwardly or rearwardly with respect to casing 14. A jam nut 166 screws onto stop pin 152 to lock the stop pin in position once it has been adjusted axially.

CLAMP-UP ASSEMBLY

Figure 2:
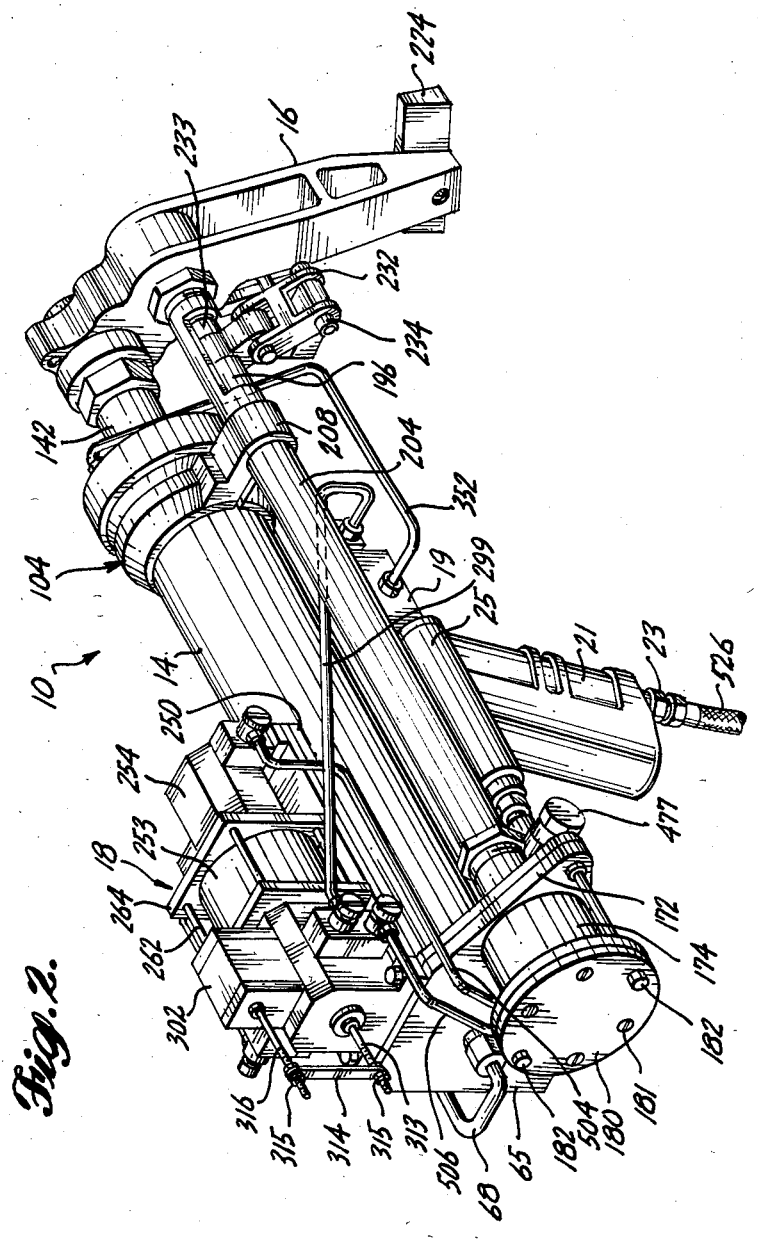
FIG. 2 is a perspective view of the drill unit, looking downwardly and forwardly on the right side of the drill unit.

Clamp-up assembly 13 is best shown by FIGS. 1, 2, 3, and 5 and, as mentioned previously, operates to clamp drill unit 10 to a template or workpiece during the drilling operation performed by the drill unit. A hydraulically actuated clamp cylinder 15 is mounted to the rear surface of a triangularly shaped section 172 that extends laterally from the main portion of support plate 65. Clamp cylinder 15 includes a cylinder 174 having a rearwardly opening bore 176 and a flange 178 that extends radially outward at the aft end of the cylinder. Bore 176 is sealed by a circular cover 180 that is fastened to the rear surface of flange 178 with bolts 181. Cylinder 174 is attached to section 172 of support plate 65 by two long bolts 182 that pass forwardly through cover 180 and flange 178 and screw into section 172 (FIGS. 2 and 3).

Clamp cylinder 15 also includes a circular piston 184 that moves axially within bore 176. A ring seal 186 fits within a circumferential groove 188 formed in the outer edge of piston 184 to form a seal at the outer edge of the piston and divide bore 176 into a retract chamber 190 forward of piston 184 and an extend chamber 192 rearward of the piston. Piston 184 is moved axially within bore 176 by introducing pressurized hydraulic fluid into the retract or extend chambers 190 and 192 as will be described in greater detail later.

A cylindrical draw rod 196 extends forwardly from clamp cylinder 15 to actuate collet 17. Draw rod 196 screws into the center of piston 184 and extends forwardly therefrom through an aperture 198 formed in the forward wall of cylinder 174. Aperture 198 is aligned with an orifice 200 that passes through section 172 and through a forwardly extending cylindrical boss 202 that is an integral part of support plate 65 (see FIG. 1). The forward end of draw rod 196 terminates at a point past the front end of casing 14. The rear end of a tubular rod housing 204 screws into boss 202 with draw rod 196 fitting coxially within the rod housing. A jam nut 206 screws onto rod housing 204 adjacent boss 202 to ensure that the rod housing does not loosen during operation of drill unit 10. The forward portion of rod housing 204 is supported and aligned by a clamp portion 208 of muffler clamp 104 (FIGS. 1 and 2), and the forwardmost end of rod housing 204 is affixed to foot 16.

Figure 6:
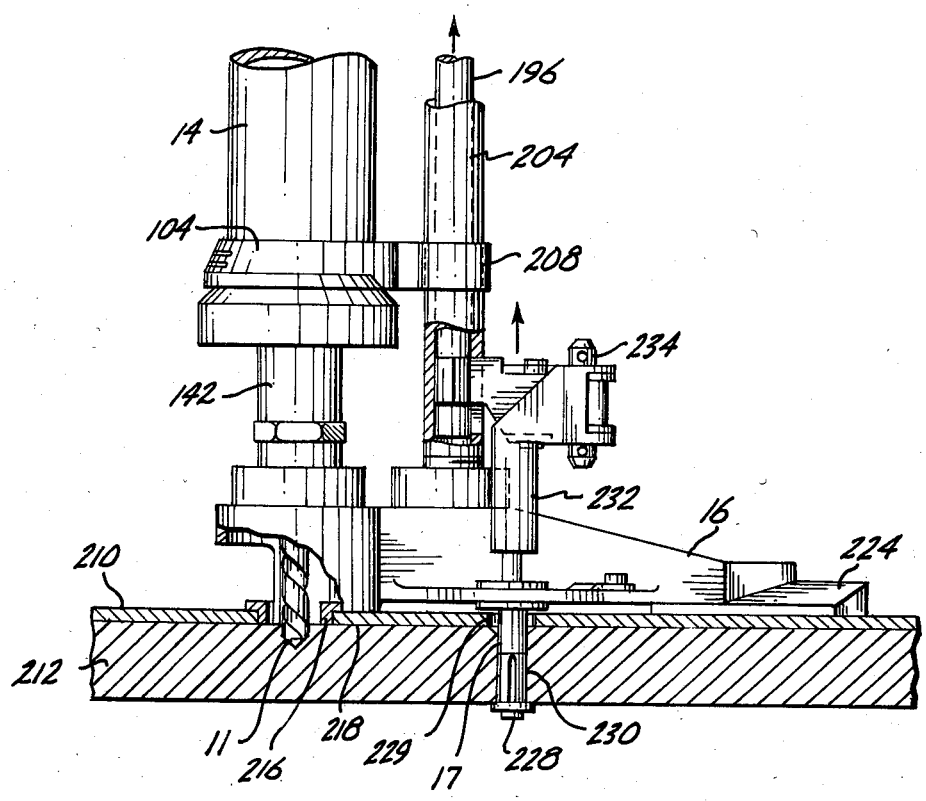
FIG. 6 is a perspective view of the forward portion of the drill unit clamped against a template and workpiece.

Referring now to FIGS. 1, 2, and 6, the operation and functioning of foot 16 and collet 17 in clamping drill unit 10 to a workpiece are substantially the same as that of the collet foot disclosed in U.S. Pat. No. 2,911,860 by J. P. Winslow et al. issued on Nov. 10, 1959. An understanding of the structure and function of foot 16 and the associated clamping mechanism will be best understood when described in the presence of a workpiece. As illustrated in FIG. 6, when the preferred embodiment of drill unit 10 is used in a drilling operation, a template 210 having a desired hole pattern is placed on the surface of a workpiece 212. In the preferred embodiment, foot 16 is an elongate, irregularly shaped component that extends outwardly from the body of drill unit 10 to support and stabilizes the drill unit when a hole is being drilled (FIGS. 1 and 6). In the depicted embodiment, an annular template boss 216 that is concentric with tool bit 11 extends forwardly from the forward surface 214 of foot 16. When drill unit 10 is positioned for drilling, template boss 216 fits within a complementary sized hole 218 in template 210. A stabilizer bar 224 that is mounted transversely at the end of foot 16 remote from template boss 216 contacts the template to support and stabilize the entire drill unit 10.

As mentioned above, a cylindrical, expansible collet 17 extends forwardly through foot 16 and clamps drill unit 10 to the template and workpiece 210 and 212. To clamp drill unit 10 to workpiece 210, collet 17 is inserted through a template hole 229 and into a hole 230 that was previously drilled in workpiece 212. A mandrel 228 that fits coaxially within collet 17 is used to expand the collet radially and wedge the collet against the inner surface of hole 230.

The aft end of mandrel 228 screws into a lift finger 232 that in turn is attached to draw rod 196. Lift finger 232 attaches to draw rod 196 through an elongate opening 233 in the wall of rod housing 204 (FIG. 2). When draw rod 196 is retracted by clamp cylinder 15, lift finger 232 draws mandrel 228 rearwardly, thereby expanding collet 17. Lift finger 232 is comprised of three parts that pivot relative to one another. The three parts are connected by pins 234 that are oriented parallel to the longitudinal axis of drill unit 10. The pivoting capability of lift finger 232 allows collet 17 to slide axially within a slot 236 that extends longitudinally along foot 16 and vary the distance between the centerline of the collet and the centerline of tool bit 11 (FIG. 1). By adjusting the distance between the axial center-lines of collet 17 and casing 14, hole spacing can be varied.

PNEUMATICALLY ACTUATED HYDRAULIC PUMP

Referring now to FIGS. 1, 2, 3, and 4, hydraulic pump 18 is attached to a mounting plate 250 that in turn is fastened to the upper surface of casing 14. The longitudinal axis of pump 18 is parallel to the longitudinal axis of casing 14 (FIGS. 1 and 4). In the preferred embodiment, the body of pump 18 is comprised of three main elements, a pneumatic cylinder 253 that is held between a forward pump housing 254 and a rear pump housing 256. Forward and rear pump housings 254 and 256 are drawn together by bolts 262 that extend between a flange 264 projecting radially at the rear end of forward pump housing 254 and a second flange 266 that extends radially at the forward end of rear pump housing 256 (FIG. 1). The front and rear ends of pneumatic cylinder 253 are centered on flanges 264 and 266 by annular projections 267 and 268, respectively, that extend axially inward from the flanges (FIG. 4). The ouside diameter of projections 267 and 268 is approximately equal to the inside diameter of pneumatic cylinder 253. Forward and rear pump housings 254 and 256 have front and rear bores 269 and 270, respectively, that open inwardly toward pneumatic cylinder 253 and receive hydraulic pistons as will be described in more detail below.

The pumping action of pump 18 is accomplished by pneumatically actuating a one-piece piston member 271 that reciprocates axially within the body of the pump (FIG. 4). In the preferred embodiment, piston member 271 is formed from an acetal polymer resin, though other materials that have a good strength-to-weight ratio and that will be unaffected by contact with hydraulic fluid can be used. A circular pneumatic piston 272 is located centrally between the front and rear ends of piston member 271 and is sized to slide axially within bore 273 of pneumatic cylinder 253. A forward hydraulic piston 274 and a rear hydraulic piston 276 are formed at the front and rear ends of piston member 271, respectively. The forward and rear hydraulic pistons 274 and 276 have identical outside diameters and move axially within front and rear bores 269 and 270, respectively, as pneumatic piston 272 reciprocates within pneumatic cylinder 253.

A conventional, two-part cap seal 278, located within a circumferential groove 280 formed in the perimeter of pneumatic piston 272, separates bore 273 into a forward pneumatic chamber 282 and a rear pneumatic chamber 284 on the front and rear sides, respectively, of pneumatic piston 272. Cap seal 278 consists of a standard O-ring and an annular seal positioned radially outward from the O-ring. The annular seal is preferably made of polytetrafluoroethylene or some other low friction material since the seal is in sliding contact with the inner surface of pneumatic cylinder 253. The use of cap seal 278 allows rapid reciprocating axial movement of piston member 271 within pneumatic cylinder 253 while preventing pressurized air from leaking past pneumatic piston 272.

Smaller diameter cap seals 290 are located within circumferential grooves 292 and 294 at the forwardmost and rearmost ends of forward and rear hydraulic pistons 274 and 276, respectively. The cap seals are employed on the hydraulic pistons 274 and 276 for the same reasons that a cap seal is used on pneumatic piston 272, i.e., to allow rapid, reciprocating axial movement of the hydraulic pistons while providing adequate sealing capability. A forward hydraulic chamber 296 is formed in front bore 269 forward of forward hydraulic piston 274. Likewise, a rear hydraulic chamber 298 is formed rearward of rear hydraulic piston 276 in rear bore 270.

As piston member 271 reciprocates within pump 18, forward and rear hydraulic pistons 274 and 276 pump hydraulic fluid to drilling and clamp-up assemblies 12 and 13. Generally, when either hydraulic piston is moving toward the center of pump 18, hydraulic fluid is drawn into the hydraulic chamber 296 or 298 that is increasing in volume. For example, as forward hydraulic piston 274 moves rearwardly, hydraulic fluid is drawn into forward hydraulic chamber 296. Similarly, as rear hydraulic piston 276 moves forwardly, hydraulic fluid is drawn into rear hydraulic chamber 298. As a hydraulic piston moves away from the center of pump 18, the hydraulic fluid held in a hydraulic chamber that is decreasing in volume is discharged under pressure into the hydraulic circuitry of drill unit 10. In one actual embodiment of drill unit 10, hydraulic fluid is discharged from pump 18 at a pressure of approximately 650–700 pounds per square inch when air at a pressure of approximately 100 pounds per square inch is supplied to drill unit 10.

Piston member 271 is urged to reciprocate within pump 18 by alternately introducing pressurized air into forward pneumatic chamber 282 and rear pneumatic chamber 284. More specifically, when piston member 271 is in its rearmost axial position, pressurized air enters rear pneumatic chamber 284 forcing piston member 271 to move forwardly. Simultaneously, air is allowed to exhaust from forward pneumatic chamber 282. Similarly, when piston member 271 is in its forwardmost axial position, pressurized air enters forward pneumatic chamber 282 as air is exhausted from rear pneumatic chamber 284, urging piston member 271 to move rearwardly.

Figure 7:
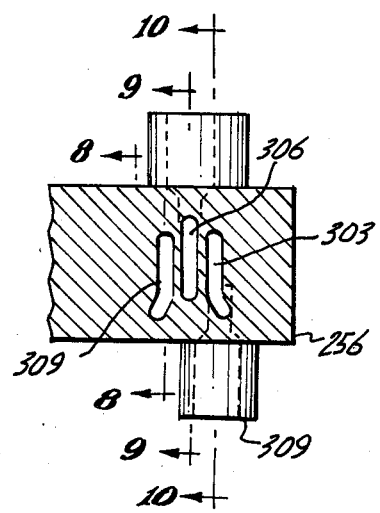
FIG. 7 is a plan view of a portion of the rear pump housing of the drill unit taken along section line 7—7 of FIG. 4.
Figure 8:
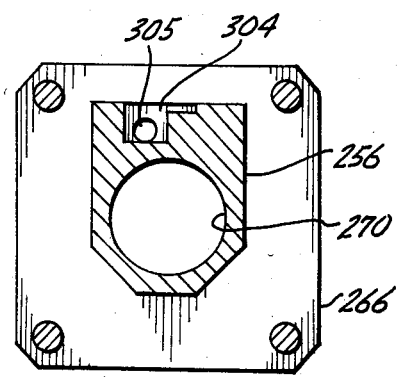
FIG. 8 is a cross-sectional view of the rear pump housing taken along section line 8—8 of FIG. 7.
Figure 9:
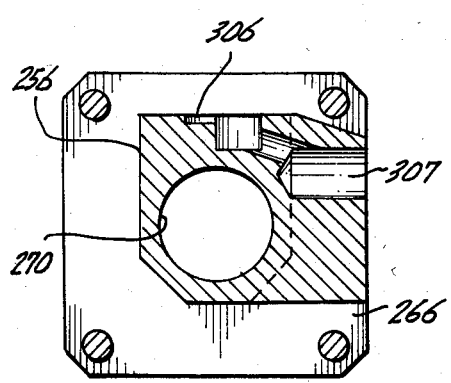
FIG. 9 is a cross-sectional view of the rear pump housing taken along section line 9—9 of FIG. 7.
Figure 10:
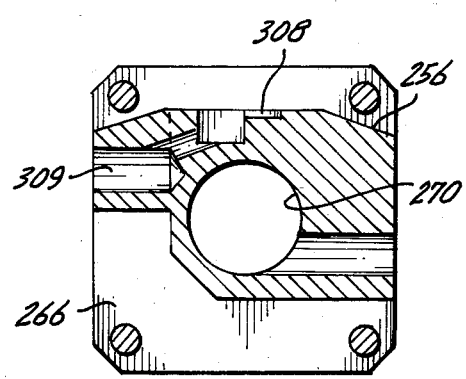
FIG. 10 is a cross-sectional plan view of the rear pump housing taken along section line 10—10 of FIG. 7.

The control of pressurized air entering and being exhausted from pump 18 is directed by a conventional, four-way, two-position pneumatic valve that is referred to herein as a frequency generator 302. Frequency generator 302 is mounted directly to the upper surface of rear pump housing 256 with the longitudinal axis of the frequency generator oriented parallel to and vertically aligned with the central longitudinal axis of pump 18 (FIGS. 2 and 4). The upper surface of rear pump housing 256 has three transversely oriented slots that place frequency generator 302 in fluid communication with pump 18 (FIG. 7). A forward slot 304 connects a forward port (not shown) of frequency generator 302 to the rear end of a longitudinally oriented aperture 305 whose forward end opens into rear pneumatic chamber 284 (FIGS. 4 and 8). A middle slot 306 connects a pneumatic supply port 307 formed on the right side of rear pump housing 256 to the inlet port of frequency generator 302 (FIG. 9). Pneumatic supply port 307 receives pressurized air from pneumatic module 19 via an external line 299 (FIGS. 1 and 2). A rear slot 308 connects a rear port (not shown) of frequency generator 302 to a rear transfer port 309 formed in the left side of rear pump housing 256 (FIG. 10). A conduit 310 connects rear transfer port 309 to a forward transfer port 311 formed on the left side of forward pump housing 254 (FIG. 3). Forward transfer port 311 supplies pressurized air to forward pneumatic chamber 282.

An interactive relationship exists between frequency generator 302 and pump 18 in that the position of valve spool 312 of frequency generator 302 is controlled by the position of piston member 271 of the pump, and pressurized air directed by the frequency generator causes the piston member to reciprocate. More specifically, a connecting rod 313 extends rearwardly from the rearmost end of piston member 271 and projects rearwardly from the aft end of rear pump housing 256. The lower end of a flat, leaf-type spring 314 is connected to the aft end of connecting rod 313 by a pair of jam nuts 315. A threaded rod 316 projects rearwardly from the rearmost end of frequency generator 302. The forward end of threaded rod 316 is attached to valve spool 312 and the aft end of the threaded rod is connected to the upper end of spring 314 by another pair of jam nuts 315. When piston member 271 is in its rearmost position, valve spool 312 is also in its rearmost position. With valve spool 312 in this position, pressurized air entering supply port 307 passes into middle slot 306, through frequency generator 302, and out front slot 304 into rear pneumatic chamber 284 urging piston member 271 forwardly. As piston member 271 moves forwardly, valve spool 312 is urged forwardly by the action of spring 314. When piston member 271 and valve spool 312 are in their forwardmost positions, pressurized air entering supply port 307 passes into middle slot 306, through frequency generator 302, and out rear slot 308 into rear transfer port 309. The pressurized air flows through conduit 310 to forward transfer port 311 and into forward pneumatic chamber 282 urging piston member 271 rearwardly. The cycling action of piston member 271 and valve spool 312 continues as long as pressurized air is supplied to drill unit 10. As will be described hereinafter, pump 18 begins operating as soon as pressurized air is supplied to drill unit 10.

Connecting rod 313 extends rearwardly through the center of a cylindrical plug 317 that is threaded into the aft end of rear pump housing 256. To prevent leakage of hydraulic fluid from rear hydraulic chamber 298, a circular spacer 318 is inserted between plug 317 and housing 256. An O-ring 320 circumferentially surrounds spacer 318 and a lip seal 322 is positioned on each side of spacer 318 to circumferentially seal connecting rod 312 while allowing the connecting rod to move axially past the seals.

PNEUMATIC-HYDRAULIC CIRCUIT

Figure 11:
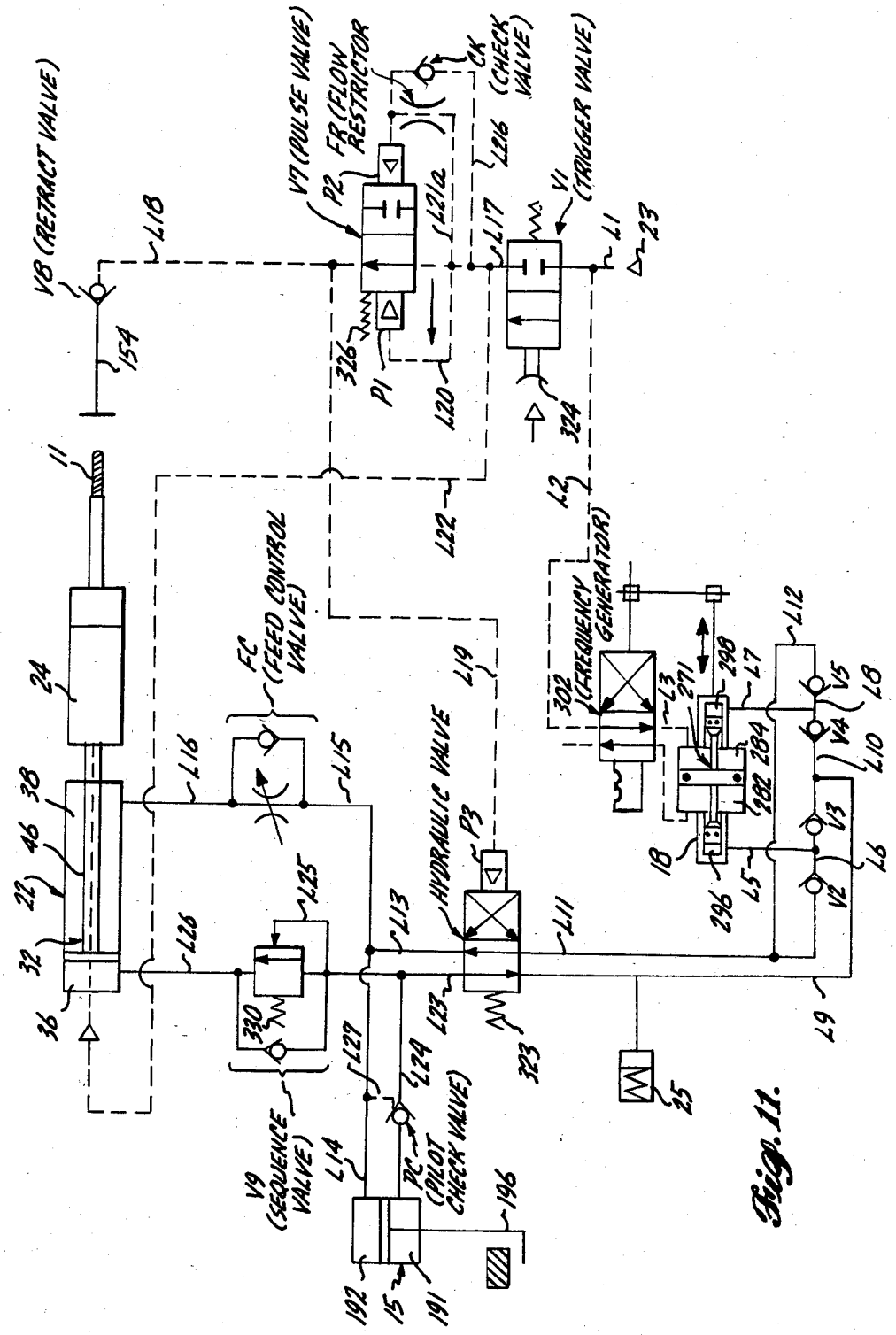
FIG. 11 is a schematic diagram of the pneumatic and hydraulic circuit of the drill unit.

As mentioned previously, power is supplied to drill unit 10 by an external source of pressurized air. The air is used to operate hydraulic pump 18, motor subassembly 24 and activate various valves within drill unit 10. As an aid in understanding the sequence of valve actuation and direction of fluid flow that occurs during the operation of drill unit 10, a schematic diagram of the pneumatic-hydraulic circuit of drill unit 10 is shown in FIG. 11. The valves (with the exception of frequency generator 302) are shown in the position they maintain when drill unit 10 is in an idle mode, i.e., with pressurized air supplied to the drill unit, but before the drill unit is actuated. The pneumatic circuit is represented by dashed lines and the hydraulic circuit is represented by solid lines.

When drill unit 10 is in the idle mode, pressurized air enters drill unit 10, but cannot reach air motor 74 because a trigger valve V1 is in a closed position. When the trigger valve V1 is in this position, pressurized air is still supplied to frequency generator 302 via lines L1 and L2 to operate pump 18. For the purposes of illustration, valve spool 312 of frequency generator 302 is shown in a position in which piston member 271 is being urged forwardly. Pressurized air passes through frequency generator 302, into a conduit or line L3 not marked on FIG. 11, and enters rear pneumatic chamber 284. The pressurized air urges piston member 271 forwardly and forces the hydraulic fluid in forward hydraulic chamber 296 into hydraulic line L5. The hydraulic fluid then enters a line L6 that connects two check valves V2 and V3 that are arranged so that check valve V2 acts as a discharge valve when piston member 271 moves forwardly and check valve V3 acts as a suction valve when piston member 271 moves rearwardly. More specifically, check valve V2 is arranged to allow the pressurized hydraulic fluid pumped from forward hydraulic chamber 296 to flow toward clamp cylinder 15 and feed cylinder 22 when piston member 271 moves forwardly, and check valve V3 is arranged to allow hydraulic fluid from the clamp and feed cylinders 15 and 22 or reservoir 25 to be drawn into forward hydraulic chamber 296 when piston member 271 moves rearwardly. An identical arrangement of check valves and hydraulic lines connects rear hydraulic chamber 298 to the hydraulic circuit. Specifically, hydraulic line L7 connects rear hydraulic chamber 298 to a hydraulic line L8 that joins two check valves, V4 and V5. These check valves are arranged so that check valve V4 acts as a suction valve when piston member 271 moves rearwardly and check valve V5 acts as a discharge valve when piston member 271 moves forwardly. Thus, it can be recognized that check valves V2 and V4 permit fluid to respectively pass from and enter the chambers of pump 18 when piston member 271 moves forwardly annd check valves V5 and V3 permit fluid to respectively pass from and flow into pump 18 when piston member 271 moves in the opposite direction.

Returning again to the hydraulic fluid discharged from forward hydraulic chamber 296, the hydraulic fluid in line L6 is discharged through check valve V2 into a line L11 that is connected to a four-way, two-position hydraulic valve V6. Hydraulic valve V6 is biased in the idle position by a spring pilot 323. When piston member 271 reverses direction and moves rearwardly, the hydraulic fluid previously drawn into rear hydraulic chamber 298 is discharged, while simultaneously, hydraulic fluid is drawn into forward hydraulic chamber 296. The hydraulic fluid discharged from rear hydraulic chamber 284 enters line L7, passes through discharge check valve V5, and passes through a hydraulic line L12 that joins line L11. Due to the arrangement of check valves V2, V3, V4, and V5, line L11 always contains pressurized hydraulic fluid while pump 18 operates.

The hydraulic fluid in line L11 pressurizes line L13, which is downstream from hydraulic valve V6. Hydraulic line L13 branches to supply pressurized hydraulic fluid to extend chamber 192 of clamp cylinder 15 and retract chamber 38 of feed cylinder 22. More specifically, line L13 joins a hydraulic line L14 that is connected to extend chamber 192. By pressurizing line L14 when drill unit 10 is in the idle mode, piston 184 of clamp cylinder 15 and draw rod 196 are kept in the extended position. Line L13 also joins a hydraulic line L15 that is connected to a feed control valve FC that controls the rate at which hydraulic fluid exhausts from retract chamber 38. The pressurized fluid in line L15 flows through a check valve portion of feed control valve FC and pressurizes a hydraulic line L16 that is downstream of the feed control valve. Line L16 is in fluid communication with retract chamber 38 of feed cylinder 22. The pressurization of line L16 and retract chamber 38 ensures that piston 32 of feed cylinder 22 is in the fully retracted position before the start of the drilling operation.

When drill unit 10 is in the idle mode, it appears that pump 18 should stop pumping once all of the hydraulic lines are pressurized. As a practical matter, once the hydraulic lines are pressurized, pump 18 slows down considerably, but continues to pump due to leakage at the seals of the various pistons.

To activate drill unit 10, i.e., commence a drilling operation, trigger valve V1 is activated by depressing a trigger 324, which places pneumatic line L1 in fluid communication with the remaining portion of the pneumatic circuit of drill unit 10. Pressurized air passes through line L17 on the downstream side of trigger valve V1 and passes through a pulse valve V7 to pressurize a portion of the pneumatic circuit that includes retract valve V8 at the end of pneumatic line L18 and the pilot P3 of hydraulic valve V6 at the end of pneumatic line L19.

Pulse valve V7 isolates retract valve V8 and pilot P3 from the rest of the pneumatic circuit. Pulse valve V7 is a double piloted, two-way, two-position pneumatic valve that is normally held in the open position by a spring 326. Upon actuation of trigger valve V1 and pressurization of pneumatic line L17, a pneumatic line L20, which connects line L17 to a pilot P1 of pulse valve V7, becomes pressurized. The pressurization of pilot P1 assists spring 326 to insure that pulse valve V7 is in the open position. Another pneumatic line L21a connects line L17 to a second pilot P2 of pulse valve V7. The air in line L21a flows through a flow restrictor FR before reaching pilot P2. The use of flow restrictor FR delays the pressurization of pilot P2 until after pilot P1 has been fully pressurized. Upon the full pressurization of pilot P2, pulse valve V7 shifts into a closed position. When pulse valve V7 closes, retract valve V8 and pilot P3 remain pressurized, but are isolated from the rest of the pneumatic circuit.

At the same time that retract valve V8 and pilot P3 are pressurized, pneumatic line L22, which connects pneumatic line L17 to air motor 74, is also pressurized, thereby actuating air motor 74 and rotating tool bit 11.

When pilot P3 of hydraulic valve V6 is pressurized, spring pilot 323 is overcome and the hydraulic valve shifts into its second or actuated position to allow pressurized hydraulic fluid from line L11 to enter a hydraulic line L23 that is downstream of hydraulic valve V6. Line L23 branches to supply hydraulic fluid to retract chamber 191 of clamp cylinder 15 and extend chamber 36 of feed cylinder 22. More specifically, a hydraulic line L24 connects line L23 to a piloted check valve PC that in turn is connected to retract chamber 191 of clamp cylinder 15. Hydraulic fluid flows through piloted check valve PC into retract chamber 191 causing draw rod 196 to retract and actuate mandrel 228 in collet 17. The hydraulic fluid held in extend chamber 192 of clamp cylinder 15 is exhausted into line L14 and through hydraulic valve V6 as hydraulic fluid fills retract chamber 191 and forces piston 184 rearwardly. The hydraulic fluid exhausted from extend chamber 192 is returned to reservoir 25 and pump 18.

Line L23 is also connected to a sequence valve V9 that is in fluid communication with extend chamber 36 of feed cylinder 22. Sequence valve V9 is a two-position, two-way valve that is held in a normally closed position by a spring pilot 330. A hydraulic line L25, which branches from line L23, acts as a second pilot to cause sequence valve V9 to open. In the preferred embodiment, sequence valve V9 does not open to allow the passage of pressurized fluid until the pressure in line L25 reaches approximately 450 pounds per square inch. Once this preset pressure is reached, sequence valve V9 opens and allows hydraulic fluid from line L23 to enter hydraulic line L26 which is in fluid communication with extend chamber 36 of feed cylinder 22. The pressurized hydraulic fluid forces piston 32 and piston rod 46 in a forward direction, thus urging motor subassembly 24 forwardly toward the workpiece. With hydraulic valve V6 in its actuated position, the hydraulic fluid in retract chamber 38 of feed cylinder 22 can be exhausted. The hydraulic fluid leaving retract chamber 38 passes through feed control valve FC at a metered rate, thus controlling the rate at which piston 32 of feed cylinder 22 moves forwardly. The hydraulic fluid being returned from feed cylinder 22 passes through pump 18 and reenters the hydraulic circuit.

When motor subassembly 24 reaches the limit of its forward travel, air motor housing 56 actuates retract valve V8 by depressing plunger 154. The actuation of retract valve V8 triggers the retract and unclamp portion of the drilling cycle of drill unit 10. Specifically, depressing plunger 154 allows the pressurized air held in the isolated portion of the pneumatic circuit consisting of retract valve V8 and pilot P3 to exhaust to atmosphere. Once the pressure at pilot P3 of hydraulic valve V6 is released, the hydraulic valve returns to its first or idle position due to the action of its spring pilot 323. At this time, hydraulic line L11 is again placed in fluid communication with hydraulic line L13 causing pressurized hydraulic fluid to enter retract chamber 38 of feed cylinder 22 and forcing piston 32 to retract. As piston 32 retracts, the hydraulic fluid in extend chamber 36 exhausts through a check valve portion of sequence valve V9 into hydraulic line L23 and through hydraulic valve V6 to reservoir 25 and pump 18.

When line L13 is pressurized after hydraulic valve V6 returns to its idle position, pressurized hydraulic fluid passes through line L14 to extend chamber 192 of clamp cylinder 15. Hydraulic fluid cannot enter extend chamber 192 until fluid is allowed to exhaust from retract chamber 191 by piloted check valve PC. In the preferred embodiment, piloted check valve PC is arranged to open when a pilot line L27 from line L14 reaches approximately 85% of system pressure. Such an arrangement allows a time delay between the time motor subassembly 24 begins to retract and the unclamping of collet 17. Once pilot line L27 opens piloted check valve PC, hydraulic fluid in retract chamber 191 can exhaust through line L24, allowing the extension of piston 184 and mandrel 228.

The retract and unclamp portion of the drilling cycle begins when retract valve V8 is actuated, whether or not trigger 324 is released. When trigger 324 is released and trigger valve V1 moves to the closed or idle position, pressurized air at pilot P2 of pulse valve V7 exhausts through flow restrictor FR and check valve CV. Check valve CV is provided because air does not flow out rapidly enough through flow resistor FR. Air exhausting through check valve CV flows through line L21b to line L17 and flows out of drill unit 10 through motor subassembly 24.

PNEUMATIC-HYDRAULIC CIRCUIT—PHYSICAL EMBODIMENT

Figure 12:
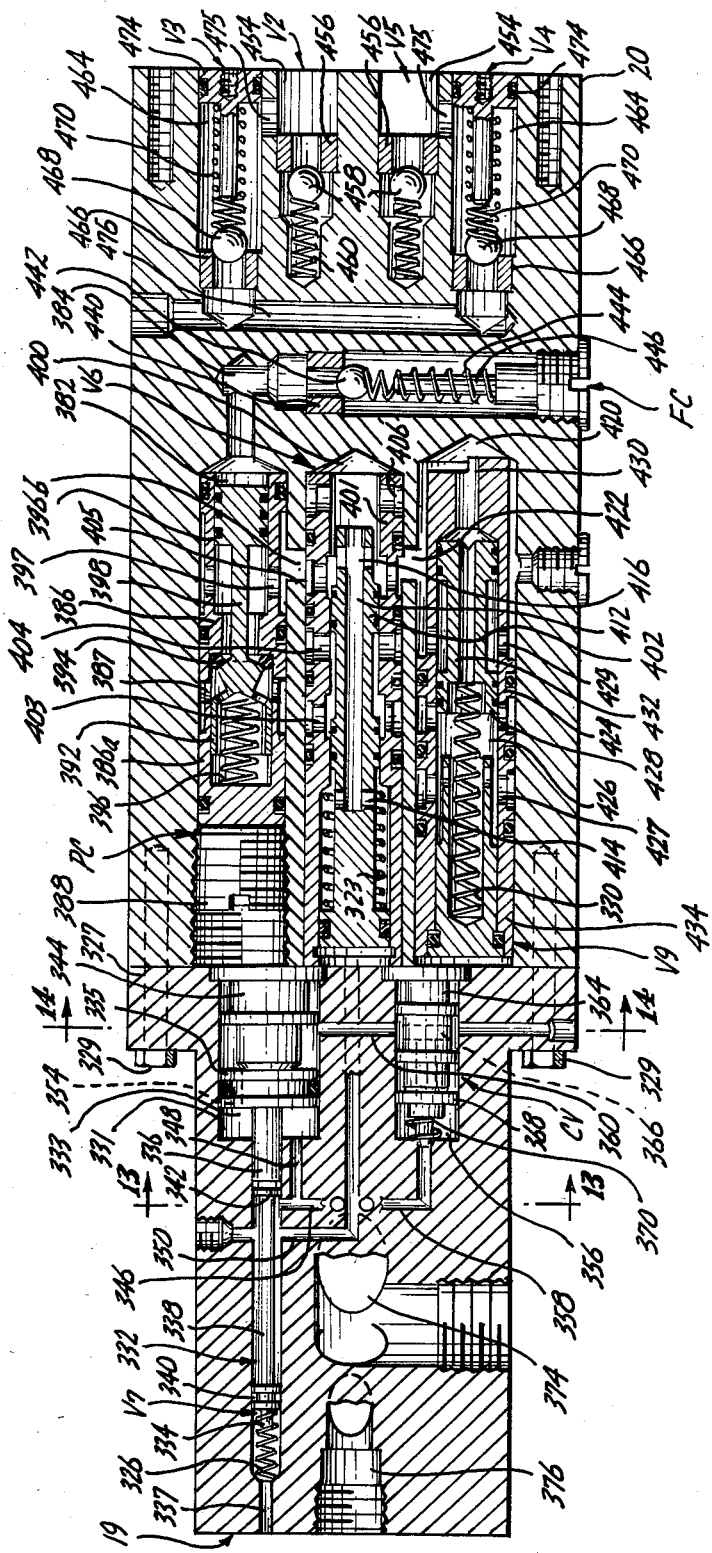
FIG. 12 is a cross-sectional plan view of the pneumatic and hydraulic modules taken along section line 12—12 of FIG. 4.

Moving on to a more detailed description of the physical embodiment of the pneumatic-hydraulic circuit, pneumatic and hydraulic modules 19 and 20 will now be described in greater detail. As mentioned previously, the rectangularly shaped pneumatic and hydraulic modules 19 and 20 mount to the lower surface of casing 14 with a pistol grip shaped handle 21 extending downwardly from the lower surface of the pneumatic and hydraulic modules (FIGS. 1 and 4). Pneumatic module 19 is located forward of hydraulic module 20, with the aft end of the pneumatic module abutting the forward end of the hydraulic module. Referring to FIG. 12, the main body of pneumatic module 19 is narrower than the body of hydraulic module 20. A pair of rectangularly shaped flange members 327 extend outwardly from the left and right sides at the rear end of pneumatic module 19 to a width equal to the width of hydraulic module 20. The pneumatic and hydraulic modules 19 and 20 are held together by a pair of bolts 329 that extend rearwardly through flange members 327 and screw into the body of the hydraulic module. The aft end of hydraulic module 20 terminates flush with the rearmost end of casing 14. Pneumatic module 19 contains pulse valve V7 and check valve CV, and hydraulic module 20 contains check valves V2, V3, V4, and V5, piloted check valve PC, hydraulic valve V6, sequence valve V9, and feed control valve FC (FIG. 12).

PNEUMATIC MODULE

Pulse Valve

When viewing pneumatic module 19 in a plan view horizontal section, pulse valve V7 is located on the right side of the pneumatic module with the longitudinal axis of the pulse valve oriented parallel to the longitudinal axis of casing 14 (FIG. 12). As mentioned previously, pulse valve V7 is used to isolate retract valve V8 and pilot P3 from the rest of the pneumatic circuit. To perform that function, pulse valve V7 includes a multidiameter bore 331 that extends the length of pneumatic module 19 and a spool 332 configured to move axially within the bore. A larger diameter, first section 333 of bore 331 begins at the aft end of pneumatic module 19 and extends forwardly approximately one third the length of the pneumatic module. A smaller diameter, second section 334 extends forwardly from first section 333 and terminates before reaching the forward end of the pneumatic module. A third section 337 has a smaller diameter than second section 334 and extends forwardly from the second section to open onto the front surface of pneumatic module 19. Spool 332 includes a spool head 335 sized to fit within the inside diameter of first section 333, and a shaft 336 that extends forwardly from the spool head. The forwardmost and rearmost portions of shaft 336 are sized to fit within the inside diameter of second section 334. An intermediate portion 338 of shaft 336 is reduced in diameter relative to the rest of the shaft to allow air to pass along the intermediate portion as will be described hereinafter.

Figure 13:
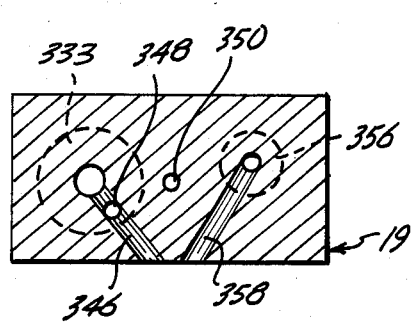
FIG. 13 is a cross-sectional view of the pneumatic module taken along section line 13—13 of FIG. 12.

A forward seal 340 and rear seal 342 are positioned on shaft 336 adjacent the forward and rear ends of intermediate portion 338 to provide an air-tight seal in second section 334 at each end of the intermediate portion. When drill unit 10 is in the idle mode, spool 332 is biased rearwardly by a spring 326 positioned in the forwardmost end of second section 334. The rearward travel of spool 332 is limited by a plug 344 inserted into the rearmost end of bore 331. When valve spool 332 is in its rearwardmost position, rear seal 342 is positioned rearward of the point at which a conduit 346 intersects second section 334. Conduit 346 extends upwardly and outwardly from the lower surface of pneumatic module 19 and supplies pressurized air to bore 331 when trigger 324 is actuated (FIG. 13). A connecting passage 348 extends rearwardly from conduit 346 parallel to bore 331 and opens into the forward end of first section 333. A transverse, horizontally oriented aperture 350 intersects second section 334 at a point forward of conduit 346. One end of transverse aperture 350 opens onto the right side of pneumatic module 19 and is connected to retract valve V8 by an external line 352 (FIGS. 1 and 2). The other end of transverse aperture 350 terminates at the rear surface of pneumatic module 19 at pilot P3 of hydraulic valve V6 (see FIG. 13). Transverse aperture 350 is equivalent to lines L18 and L19 in the schematic diagram of FIG. 11.

When drill unit 10 is actuated, pressurized air is supplied through conduit 346 and enters second section 334. The pressurized air then passes into transverse aperture 350 to pressurize retract valve V8 and pilot P3. Pressurized air in conduit 346 also passes rearwardly through connecting passage 348 and enters first section 333 on the front side of spool head 335. The air supplied by connecting passage 348 operates as pilot P1 shown in FIG. 11 and insures that valve spool 332 is in its rearmost position. The air in first section 331 forward of spool head 335 passes rearwardly through a small diameter hole 354 in spool head 335 to pressure first section 333 rearward of the spool head. Hole 354 is oriented parallel to bore 331 and serves as flow restrictor FR shown in FIG. 11. The pressurization of first section 333 rearward of spool head 335 acts as pilot P2 and urges spool 332 forwardly when pilot P2 is at full line pressure. When valve spool 332 is in its forwardmost position, rear seal 342 is positioned between the locations at which conduit 346 and transverse aperture 350 enter bore 331, thereby isolating retract valve V8 and pilot P3 from the rest of the pneumatic circuit.

Check Valve

Figure 14:
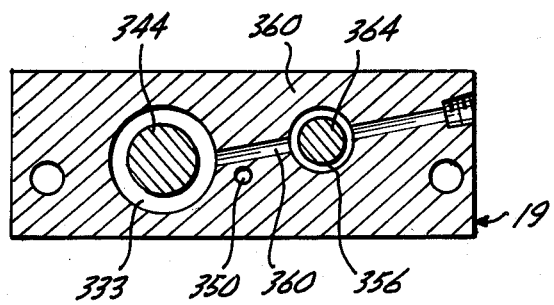
FIG. 14 is a cross-sectional view of the pneumatic module taken along section line 14—14 of FIG. 12.

As illustrated in FIG. 12, check valve CV is spaced away from pulse valve V7 toward the left side of pneumatic module 19. Check valve CV operates to allow pressurized air held on the pilot P2 side of pulse valve V7 to exhaust to atmosphere after trigger 324 is released, thereby allowing valve spool 332 to return to its rearwardmost or idle position. Check valve CV includes a valve cavity 356 that is approximately the same length as first section 333 of bore 331. A conduit 358 that begins at the lower surface of pneumatic module 19 adjacent conduit 346 extends upwardly and outwardly toward the left side of the pneumatic module and is connected to the forward end of valve cavity 356 (FIGS. 12 and 13). A passage 360 extends transversely across pneumatic module 19 and connects valve cavity 356 to first section 333 (FIGS. 12 and 14). Passage 360 enters first section 333 rearward of spool head 335 and is equivalent to line L21a in FIG. 11. A multi-diameter valve plug 364 fits into valve cavity 356. Valve plug 364 includes an internal passage 366 that places passage 360 in fluid communication with the forward portion of valve cavity 356. Passage 366 includes a transversely oriented section and a section aligned with the longitudinal axis of pneumatic module 19. A valve member 368 is positioned at the forward end of passage 366 to control the flow of air through the passage. Valve member 368 is biased rearwardly against the forward end of passage 366 by a spring 370. The configuration of valve member 368 and passage 366 allows air to flow forwardly through valve cavity 356 and out conduit 358 while preventing the passage of air in the reverse direction. When trigger 324 is actuated, pressurized air in conduit 358 holds valve member 368 against the forward end of passage 366 and prevents pressurized air in first section 333 from exhausting through check valve CV. When trigger 324 is released and trigger valve V1 closes, conduit 358 is no longer pressurized and pressurized air in first section 333 exits past valve member 368 into conduit 358.

Air Passages

Another air passage within pneumatic module 19 is a forwardly and upwardly directed aperture 374 that begins on the lower surface of the pneumatic module adjacent conduits 346 and 358 and terminates at an opening on the left side of the pneumatic module. Aperture 374 supplies pressurized air to motor subassembly 24 through external line 68 (FIG. 3). Another air passage in pneumatic module 19 is orifice 376 that is located forwardly of aperture 374. Orifice 376 begins on the lower surface of pneumatic module 19, extends forwardly and upwardly therefrom and terminates at an opening on the front surface of the pneumatic module. Orifice 376 supplies pressurized air to pump 18 through external line 299 (FIGS. 1 and 2).

HYDRAULIC MODULE

Moving on to a description of hydraulic module 20, FIG. 12 illustrates the components for all of the hydraulic valves housed within the hydraulic module. The longitudinal axes of all of the hydraulic valves in hydraulic module 20 with the exception of feed control valve FC are oriented parallel to the longitudinal axis of hydraulic module 20. The longitudinal axis of feed control valve FC is oriented transversely to the longitudinal axes of the rest of the hydraulic valves. Piloted check valve PC, hydraulic valve V6, and sequence valve V9 are located at the forward end of hydraulic module 20 and check valves V2, V3, V4, and V5 are located at the rear end of the hydraulic module. A description of the physical embodiment of each valve will be given, after which a system of internal passages within hydraulic module 20 that connect the valves will be described.

Piloted Check Valve

Piloted check valve PC is located on the right side of hydraulic module 20 and includes a valve cavity 382 that begins at the forward surface of the hydraulic module and extends rearwardly for approximately two-thirds of the length of the module. The rearmost end of valve cavity 382 intersects the inner end of a transversely oriented valve cavity 384 of feed control valve FC. Piloted check valve PC includes a two-part valve body 386 held within valve cavity 382 by a threaded plug 388 that is screwed into the forward end of the valve cavity. A forward portion 386a of the valve body is cup shaped with the opening of the cup oriented rearwardly. The wall of forward portion 386a has an orifice 387 for the passage of hydraulic fluid therethrough. A valve member 392 is configured for limited axial movement within forward portion 386a. Valve member 392 is biased rearwardly against a seal 394 by a spring 396. The rearwardmost or idle position of valve member 392 prevents the passage of hydraulic fluid past seal 394. Seal 394 is positioned at the forward end of a rear portion 386b of valve body 386. Rear portion 386b is generally tubular in shape and extends rearwardly for most of the length of valve cavity 382. An orifice 397 in the wall of rear portion 386b allows the passage of hydraulic fluid therethrough. A cylindrical pilot member 398 is configured for axial sliding movement with rear portion 386b of valve body 386. The forwardmost end of pilot member 398 abuts the rearmost end of valve member 392. When hydraulic pressure is applied to the rearmost end of pilot member 398 through the aft end of rear portion 386b, the pilot member slides forwardly and urges valve member 392 away from seal 394 allowing hydraulic fluid entering orifice 387 to move past the seal and exit through orifice 397. The rearmost end of valve body 386 is open to valve cavity 382 and is equivalent to line L27 in the schematic diagram of FIG. 11.

Hydraulic Valve

Hydraulic valve V6 is positioned next to piloted check valve PC and is oriented along the longitudinal center line of hydraulic module 20. Hydraulic valve V6 is configured substantially like a conventional four-way, two-position valve. A valve cavity 400 holds a fixed, tubular valve housing 401 and an axially translatable valve spool 402. The forwardmost end of valve cavity 400 and valve housing 401 open onto the front surface of hydraulic module 20. This forwardly directed opening of hydraulic valve V6 is positioned to abut the rear terminus of transverse aperture 350, which acts as pilot P3. When pressurized air is introduced into transverse aperture 350 from pulse valve V7, valve spool 402 of hydraulic valve V6 is forced rearwardly into a second or actuated position. The wall of valve housing 401 has typical first, second, third, and fourth apertures 403, 404, 405, and 406 from front to rear, respectively, extending transversely therethrough that provide passageways for hydraulic fluid moving through the valve. A transverse orifice 407 connects valve cavity 382 of piloted check valve PC to valve cavity 400. Transverse orifice 407 is located adjacent third aperture 405.

As mentioned previously, valve spool 402 moves axially within valve housing 401. Valve spool 402 is biased forwardly into a first or idle position by a coil spring 323 that is located at the forward end of the valve. When valve spool 402 is in the idle position, first aperture 403 is in fluid communication with second aperture 404, and third aperture 405 is in fluid communication with fourth aperture 406. This arrangement permits pressurized hydraulic fluid supplied to retract chamber 38 of feed cylinder 22 and extend chamber 192 of clamp cylinder 15 to enter second aperture 404 and exit through first aperture 403 (see FIG. 11). With valve spool 402 in the idle position, hydraulic fluid returning to pump 18 through piloted check valve PC enters hydraulic valve V6 through transverse orifice 407, passes through third aperture 405, and exits through fourth aperture 406. When valve spool 402 is moved rearwardly into its actuated position, first aperture 403 is isolated from second aperture 404, second and third apertures 404 and 405 are placed in fluid communication, and the third aperture is isolated from fourth aperture 406. Valve spool 402 has a central aperture 412 that begins at the rearmost end of the valve spool and extends forwardly therefrom. Forward and rear transverse apertures 414 and 416 connect central aperture 412 to the outside surface of valve spool 402. Central aperture 412 and forward and rear transverse apertures 414 and 416 are arranged so that when valve spool 402 is in its actuated position, first aperture 403 is in fluid communication with fourth aperture 406.

With valve spool 402 in its actuated position, pressurized hydraulic fluid supplied to second aperture 404 exits through third aperture 405 to piloted check valve PC and passes to retract chamber 191 of clamp cylinder 15. Hydraulic fluid exiting third aperture 405 also goes to sequence valve V9 and on to extend chamber 36 of feed cylinder 22. Hydraulic fluid returning from extend chamber 192 of clamp cylinder 15 and retract chamber 38 of feed cylinder 22 enters hydraulic valve V6 through first aperture 403, passes through forward transverse aperture 414, central aperture 412, and rear transverse aperture 416 before exiting the hydraulic valve through fourth aperture 406 to return to reservoir 25 and pump 18.

Sequence Valve

Sequence valve V9 is spaced away from hydraulic valve V6 toward the left side of hydraulic module 20. As described previously, sequence valve V9 is used to control the flow of hydraulic fluid to extend chamber 36 of feed cylinder 22. Sequence valve V9 operates to introduce a short time delay between the time hydraulic fluid is supplied to the sequence valve and the time sequence valve V9 opens to allow fluid to flow to feed cylinder 22. To accomplish this function, sequence valve V9 includes a valve cavity 420 that is in fluid communication with valve cavity 400 of hydraulic valve V6 via a transverse passage 422. A valve casing 424, having an internal aperture 426 extending the length thereof, fits within valve cavity 420. Three transverse holes, forward, central and rear holes 427, 428, and 429, respectively, are formed in the wall of valve casing 424, approximately adjacent the central portion of internal aperture 426. The rear portion of internal aperture 426 has a smaller diameter than the rest of the internal aperture and holds a longitudinally oriented pin 430 in sliding relationship therein. The aft end of valve casing 424 is smaller in diameter than the inside diameter of valve cavity 420 and is configured to allow pressurized hydraulic fluid to reach the rearmost end of pin 430. A spool 432 slides axially within the middle portion of internal aperture 426. Spool 432 is biased rearwardly into an idle position by a spring 330 that is held within a cup shaped end plug 434 located at the forward end of valve cavity 400. When spool 432 is in the idle position, hydraulic fluid exhausted from extend chamber 36 of feed cylinder 22 passes through central hole 428 into internal aperture 426 and out through foend plug 434 located at the forward end of valve cavity 400. When spool 432 is in the idle position, hydraulic fluid exhausted from extend chamber 36 of feed cylinder 22 passes through central hole 428 into internal aperture 426 and out through forward hole 427 to reservoir 25.

When pressurized hydraulic fluid passes through transverse passage 442 from hydraulic valve V6 into sequence valve V9, the hydraulic fluid acts on the rearmost end of pin 430. Pin 430 is urged forwardly by the hydraulic fluid into contact with the rear end of spool 432, thus urging the spool forwardly into an actuated position. In the preferred embodiment, pin 430 is sized to urge spool 432 forwardly when the hydraulic pressure against the end of the pin is approximately 450 pounds per square inch. With spool 432 pushed into the actuated postion, pressurized hydraulic fluid is allowed to flow from hydraulic valve V6 through rear hole 429 into internal aperture 426. The hydraulic fluid then flows out through central hole 428 to extend chamber 36 of feed cylinder 22.

Feed Control Valve

Moving rearwardly on hydraulic module 20, feed control valve FC is oriented transversely across the hydraulic module rearward of piloted check valve PC, hydraulic valve V6, and sequence valve V9. The check valve portion of feed control valve FC is illustrated in FIG. 12 and is housed within valve cavity 384. Valve cavity 384 opens onto the left side of hydraulic module 20 and extends across the hydraulic module until it intersects valve cavity 382 of piloted check valve PC as described previously. The check valve portion of feed control valve FC includes a check valve seat 440 located toward the inner end of valve cavity 384. A ball 442 is urged against the outer edge of check valve seat 440 by a spring 444. Spring 444 is held in position by a locator pin 446 that screws into the open end of valve cavity 384 on the left side of hydraulic module 20.

As described in the explanation of the schematic diagram shown in FIG. 11, feed control valve FC includes a flow restricter portion that controls the rate at which hydraulic fluid is expelled from retract chamber 38. The flow restricter portion of feed control valve FC comprises a transverse passage 450 that is separate from, but in fluid communication with valve cavity 384 (see FIGS. 15 and 16). Transverse passage 450 allows hydraulic fluid to bypass the check valve portion of feed control valve FC through a pair of vertical orifices that place transverse passage 450 in fluid communication with the inner and outer ends of valve cavity 384. The vertical orifices will be described in more detail later. As best shown in FIGS. 15 and 16, transverse passage 450 is oriented parallel to, and located forwardly and upwardly from valve cavity 384. The inside diameter of transverse passage 450 is sized to control the rate at which fluid flows through the transverse passage.

Figure 5:
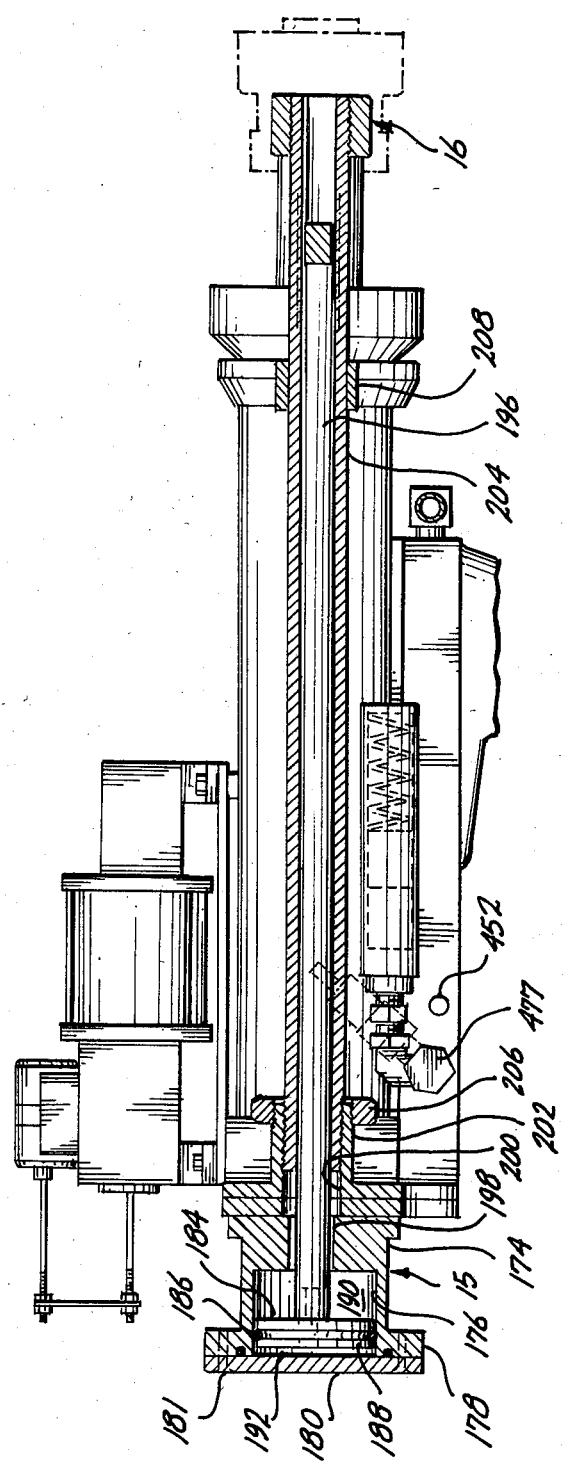
FIG. 5 is a cross-sectional, side elevation view of the clamp-up assembly of the drill unit excluding the foot.

Transverse passage 450 opens onto the right side of hydraulic module 20 and extends most of the width of the hydraulic module. The open end of transverse passage 450 is closed by a plug 452 (FIG. 5).

Check Valves

Continuing with the description of hydraulic module 20, check valves V2, V3, V4, and V5 are located at the aft end of the hydraulic module. In the embodiment illustrated in FIG. 12, the discharge check valves V2 and V5 are located adjacent one another and spaced laterally on each side of a longitudinal centerline through hydraulic module 20. Suction check valves V3 and V4 are spaced outwardly from check valves V2 and V5, respectively. Since the elements and arrangement of check valves V4 and V5 are identical to check valves V2 and V3, the configuration of check valves V2 and V3 will be described herein. Reference numerals for the elements described with respect to check valves V2 and V3 will be used on the corresponding components in check valves V5 and V4, respectively.

Check valve V2 includes a valve cavity 454 that opens onto the rear surface of hydraulic module 20. An annular valve seat 456 is held by an interference fit in the central portion of valve cavity 454. A ball 458 is urged against the forward side of valve seat 456 by a spring 460 whose forward end abuts the forward end of valve cavity 454. This arrangement of ball and valve seat allows hydraulic fluid to flow forwardly through valve cavity 454 past valve seat 456. Hydraulic fluid enters the aft end of valve cavity 454 from apertures formed in support plate 65 as will be described in more detail later.

Located outward from check valve V2 is check valve V3. Check valve V3 includes a valve cavity 464 that opens onto the rear surface of hydraulic module 20 and extends forwardly to a point forward of the forward terminus of valve cavity 454. An annular seat 466 is held by an interference fit in the forward end of valve cavity 464. A ball 468 is biased against the rear surface of valve seat 466 by a rearwardly extending spring 470. Spring 470 is held in place by a forwardly extending rod-like portion of a check valve stop 474 that closes off the aft end of valve cavity 464. Valve cavity 464 is connected to valve cavity 454 by a passage 475 that allows hydraulic fluid to flow from check valve V3 into check valve V2. Passage 475 is equivalent to lines L6 and L8 in the schematic diagram of FIG. 11.

The forward end of valve cavity 464 of check valves V3 and V4 intersects a transverse conduit 476 that begins at the right side of hydraulic module 20 and extends transversely across the hydraulic module to a point in front of check valve V4. A fitting 477 connects the end of transverse conduit 476 to reservoir 25 (FIG. 1).

Internal Passages

Hydraulic fluid flows between the valves of hydraulic module 20 through a set of channels and apertures formed within the hydraulic module. In a present embodiment, hydraulic module 20 is formed from an upper and as will be recognized in some cases lower section 478 and 479 that are brazed together by a dip braze process. In some cases it may be advantageous to utilize a unitary construction or other configuration. With respect to the depicted two-piece brazed arrangement, prior to joining upper and lower sections 478 and 479, a set of channels is formed in the lower surface of upper section 478 (FIG. 17). Lower section 479 is formed with the valve cavities and passages described previously (FIG. 15), and also has a set of apertures 481 that are drilled vertically into the upper surface of the lower section to connect various valve cavities and passages. The apertures 481 are positioned to be aligned with the ends of the channels formed in upper section 478 when the upper and lower sections 478 and 479 are joined. The channels formed in upper section 478 are superimposed over the apertures formed in lower section 479, thereby providing fluid communication between specific valves and passages within hydraulic module 20. Referring now to FIG. 17, the channels of hydraulic module 20 will be described. A y-shaped channel 480 is oriented longitudinally on upper section 478 approximately along a longitudinal centerline through the upper section. Channel 480 places the forward ends of valve cavity 454 of discharge valves V2 and V5 in fluid communication with second aperture 404 of hydraulic valve V6. Conduit 480 is equivalent to hydraulic lines L11 and L12 in the schematic diagram of FIG. 11. A dog-leg shaped second channel 482 is spaced away from channel 480 toward the right side of hydraulic module 20 and places first aperture 403 of hydraulic valve V6 in fluid communication with valve cavities 382 and 384 of piloted check valve PC and feed control valve FC, respectively, transverse aperture 450, and extend chamber 192 of clamp cylinder 15. Second channel 482 is placed in fluid communication with the rear end of valve cavity 382, the inner end of valve cavity 384 and the outer portion of transverse aperture 450 by a vertically oriented aperture 483 that intersects the above-described cavities and transverse aperture and opens onto the middle of second channel 482. Second channel 482 is placed in fluid communication with extend chamber 192 via a longitudinally oriented passage 484 that opens onto the rear surface of hydraulic module 20 (FIGS. 17 and 18). A third channel 486 is spaced outwardly from second channel 484 toward the right side of hydraulic module 20. Third channel 486 places orifice 387 of piloted check valve PC in fluid communication with retract chamber 191 via a longitudinally oriented passage 488 that opens onto the rear surface of hydraulic module 20 (FIGS. 17 and 18).

A fourth channel 492 is spaced away from channel 480 toward the left side of hydraulic module 20. Fourth channel 492 places forward hole 427 of sequence valve V9 in fluid communication with fourth aperture 406 of hydraulic valve V6 and transverse conduit 476 (which is connected to check valves V3 and V4 and reservoir 25). A fifth channel 494 is spaced away from fourth channel 492 toward the left side of hydraulic module 20. Fifth channel 494 places central hole 428 of sequence valve V9 in fluid communication with extend chamber 36 of feed cylinder 22. Fifth channel 494 is placed in fluid communication with extend chamber 36 via a longitudinally oriented passage 496 that opens onto the rear surface of hydraulic module 20 (FIGS. 17 and 18). A sixth channel 498 is spaced outwardly from fifth channel 494 and places the outer end of valve cavity 384 and transverse aperture 450 of feed control valve FC in fluid communication with retract chamber 38. The outer end of valve cavity 384 and transverse aperture 450 are placed in fluid communication by a vertical aperture 499. Sixth channel 498 is placed in fluid communication with retract chamber 38 via a longitudinally oriented passage 500 that opens onto the rear surface of hydraulic module 20 (FIGS. 17 and 18).

EXTERNAL HYDRAULIC SUPPLY LINES

Figure 19:
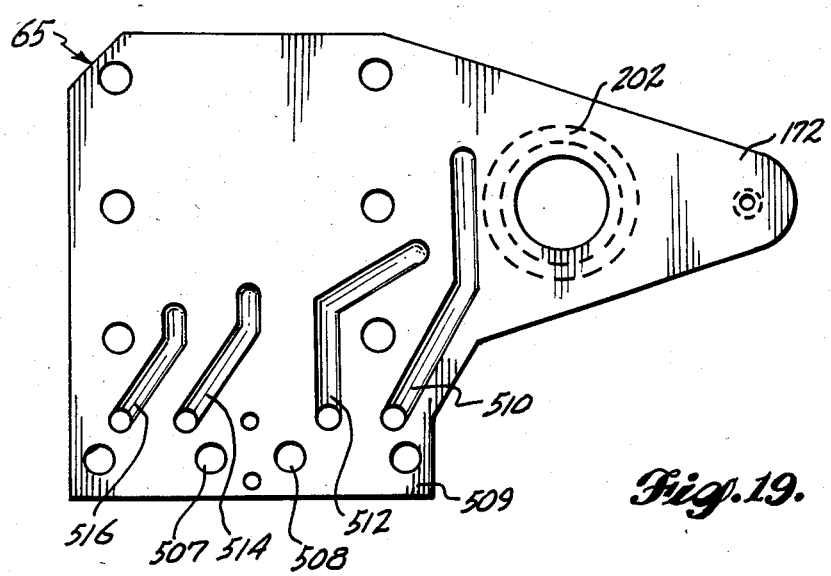
FIG. 19 is a cross-sectional view of the support plate of the drill unit.

To supply hydraulic fluid to hydraulic module 20, lines 504 and 506 extend from forward pump housing 254 and rear pump housing 256, respectively, to the rear surface of support plate 65 (FIGS. 2 and 3). The ends of external lines 504 and 506 that terminate at support plate 65 are connected to the rearwardly opening valve cavities of check valve V2 and V5, respectively, by apertures 507 and 508 that extend through support plate 65 (FIG. 19).

INTERNAL PASSAGES WITHIN SUPPORT PLATE

Pressurized hydraulic fluid is delivered from hydraulic module 20 to feed cylinder 22 and clamp cylinder 15 through passages 484, 488, 496, and 500 that open onto the rear surface of hydraulic module 20 (FIG. 18). These four passages abut openings on the foward surface of support plate 65 that in turn are connected to internal passages within the support plate. The internal passages are in fluid communication with feed and clamp cylinders 22 and 15. Support plate 65 is constructed in a manner analogous to the construction of hydraulic module 20. That is, support plate 65 is comprised of two separate pieces that are joined together by the process of dip brazing. Prior to joining a forward and rear piece together to form support plate 65, internal passages are formed on the rear surface of the forward section 509 that forms support plate 65. FIG. 19 illustrates the preferred arrangement of internal passages within support plate 65. As viewed from the rear, and moving from right to left, a first passage 510 extends upwardly and connects passage 488 to retract chamber 191 of clamp cylinder 15. A second passage 512 is spaced away from first passage 510 and connects passage 484 to extend chamber 192 of clamp cylinder 15 via a longitudinally oriented internal conduit 513 formed in the wall of cylinder 174 (FIG. 5). A third passage 514 is spaced away from second passage 512 and connects passage 496 in hydraulic module 20 to extend chamber 36 of feed cylinder 22. Finally, a fourth passage 516 connects passage 500 to retract chamber 38 of feed cylinder 22 via a longitudinally oriented conduit 518 formed in the wall of cylinder 28 (FIG. 4).

HANDLE AND TRIGGER VALVE

To allow an operator to hold drill unit 10, a pistol-grip shaped handle 21 extends downwardly from the lower surfaces of pneumatic and hydraulic modules 19 and 20 (FIGS. 3 and 4). Handle 21 also serves as a connection point for supplying pressurized air to drill unit 10. More specifically, a pneumatic fitting 23 is screwed into the lower end of an adaptor 524 that is inserted into the lower end of handle 21. Pneumatic fitting 23 is configured to receive a pneumatic hose 526 (FIGS. 1 and 4). Trigger valve V1 is housed within handle 21 to control the supply of pressurized air to drill unit 10.

Trigger valve V1 is an on/off, poppet-type valve located above adaptor 524. Trigger valve V1 includes a rod-like poppet 530 that moves axially within an upwardly and forwardly oriented cylindrical aperture 532 that is aligned with adaptor 524. The lower end of poppet 530 has a circular member 534 that seats aginst the lowermost opening of aperture 532. A coil spring 536, located below poppet 530, is held in place by the upper end of adaptor 524 and urges poppet 530 into a closed position. To open trigger valve V1, i.e., urge poppet 530 downwardly, a trigger 324, extending forwardly from handle 21, is moved rearwardly. Trigger 324 is biased forwardly by a spring 538. A downwardly oriented ramp surface 540 located at the aft end of trigger 324 contacts the upper end of poppet 530. When trigger 324 moves rearwardly, ramp surface 540 urges poppet 530 downwardly so that circular member 534 moves away from the lower end of aperture 532, thereby opening trigger valve V1.

As mentioned previously during the discussion of the schematic diagram shown in FIG. 11, when trigger valve V1 is in the closed position and pressurized air is supplied to drill unit 10, pressurized air is still supplied to pump 18. To allow pressurized air to reach pump 18 when trigger valve V1 is in the closed position, handle 21 contains a first air chamber 544 at the upper end of adaptor 524. First chamber 544 is in fluid communication with a second chamber 546 that extends substantially the length of handle 21. A forwardly and upwardly directed passage 550 extends from the upper end of second chamber 546 and connects to orifice 378 in pneumatic module 19. As described previously, orifice 378 is placed in fluid communication with rear pump housing 256 via external line 299 (FIG. 2). Thus, pressurized air entering drill unit 10 through adaptor 524 bypasses trigger valve V1 to reach pump 18.

When trigger valve V1 is opened by actuating trigger 324, pressurized air continues to be supplied to pump 18 as well as being supplied to motor subassembly 24. When circular member 534 is moved away from the lower end of aperture 532, pressurized air enters a third chamber 552 and passes upwardly through a passage 554 that is in fluid communication with the lower ends of aperture 374, and conduits 346 and 358. Air that enters aperture 374 goes to motor subassembly 24 via external line 68 to actuate air motor 74 (FIG. 3). As described previously, pressurized air that passes upwardly through conduit 346 enters bore 331 of pulse valve V7 and enters transverse aperture 350, thereby pressurizing retract valve V8 and pilot P3 of hydraulic valve V6 (FIG. 12). Once the subcircuit of retract valve V8 and pilot P3 are pressurized, pulse valve V7 is actuated and isolates that subcircuit from the rest of the pneumatic circuit.

OPERATION

Idle Mode

To use drill unit 10, the drill unit is connected to a source of pressurized air. After connection to an air source and prior to actuation of trigger valve V1, drill unit 10 is in an idle mode, wherein pressurized air is supplied to pump 18 and the pump pressurizes the hydraulic system of the drill unit. More specifically, external lines 504 and 506 to hydraulic module 20, channels 480, 482, and 498 within the hydraulic module, and first and fourth passages 510 and 516 in support plate 65 are pressurized. Due to leakage past hydraulic seals within the system, pump 18 continues to pump once the hydraulic lines have been pressurized. If no leakage were present, the pump would stall once full system pressure had been reached.

Drilling Mode

To use drill unit 10 for a drilling operation, stabilizing foot 16 of drill unit 10 is placed against a template 210 with collet 17 inserted through template hole 229 and into hole 230 in the workpiece (FIG. 6). At this time, template boss 216 is also inserted into a complementary hole 218 in template 210. Hole 218 is aligned with the location at which a hole will be machined by drill unit 10. Once drill unit 10 has been positioned against the template and workpiece 210 and 212, the operator pulls trigger 324, thereby opening trigger valve V1. When trigger valve V1 is opened, pressurized air is supplied to motor subassembly 24, actuating air motor 74 and causing tool bit 11 to rotate. Simultaneously, retract valve V8 and pilot P3 of hydraulic valve V6 are pressurized. Once retract valve V8 and pilot P3 are pressurized, pulse valve V7 shifts so that retract valve V8 and pilot P3 are isolated from the rest of the pneumatic circuit. The pressurization of pilot P3 actuates hydraulic valve V6 and causes valve spool 402 to move to its actuated position.

When hydraulic valve V6 is actuated, pump 18 supplies pressurized hydraulic fluid to extend chamber 191 of clamp cylinder 15, thereby causing mandrel 228 to retract within collet 17 and clamping the collet within hole 230. Drill unit 10 is thus held firmly against template 210. Upon the actuation of hydraulic valve V6, pressurized hydraulic fluid is also supplied to sequence valve V9, which is interposed between the hydraulic valve and extend chamber 36 of feed cylinder 22 (FIG. 11). As described previously, in the preferred embodiment, sequence valve V9 is configured to open at a pressure of approximately 450 pounds per square inch. Thus, there is a slight delay between the time that pressurized hydraulic fluid is supplied to sequence valve V9 and the time the valve opens. This time delay ensures that collet 17 clamps to workpiece 212 before tool bit 11 advances toward the workpiece. When a pressure of 450 pounds per square inch is reached, sequence valve V9 is actuated to allow pressurized hydraulic fluid to reach extend chamber 36. When extend chamber 36 is pressurized, piston 32 of feed cylinder 22 is urged forwardly, thereby moving motor subassembly 24 in a forward direction. As motor subassembly 24 travels forwardly, tool bit 11 advances into workpiece 212. The rate at which motor subassembly 24 advances is controlled by the rate that hydraulic fluid exhausts from retract chamber 38 through the flow restrictor portion (transverse aperture 450) of feed control valve FC.

Motor subassembly 24 travels forwardly until the forward surface of housing 56 contacts and depresses plunger 154 of retract valve V8. Motor subassembly 24 continues to advance until housing 56 abuts the body of retract valve V8. Housing 56 rests against the body of retract valve V8 until the hydraulic circuit pressurizes retract chamber 38 of feed cylinder 22 to retract motor subassembly 24. The period of time that housing 56 rests against retract valve V8 provides a short dwell during which a countersinking operation can be completed. When plunger 154 is depressed, the pressurized air held in the pneumatic circuit consisting of retract valve V8 and pilot P3 is released to atmosphere, allowing valve spool 402 of hydraulic valve V6 to return to its idle position.

With hydraulic valve V6 in its idle mode, pressurized fluid is supplied to retract chamber 38 of feed cylinder 22 through the check valve portion of feed control valve FC. As pressurized hydraulic fluid fills retract chamber 38, piston 32 is urged rearwardly, retracting motor subassembly 24. As piston 32 moves rearwardly in feed cylinder 22, hydraulic fluid within extend chamber 36 exhausts through sequence valve V9 toward pump 18.

Upon the return of hydraulic valve V6 to its idle mode, pressurized hydraulic fluid is also supplied to extend chamber 192 of clamp cylinder 15. Piston 184 of clamp cylinder 15 cannot move forwardly to unclamp collet 17 until the hydraulic fluid held within retract chamber 191 is exhausted through piloted check valve PC. Pressurized hydraulic fluid is supplied to the rear surface of pilot member 398, which is sized to open the piloted check valve at approximately 85% of system pressure. Once piloted check valve PC is open, the hydraulic fluid held within retract chamber 191 exhausts through third channel 486, piloted check valve PC, and hydraulic valve V6 to pump 18, allowing piston 184 to move forwardly and unclamp collet 17. A complete drilling cycle of drill unit 10 is thereby completed.

It has been found that a drill unit constructed in accordance with the present invention can drill a hole more rapidly than would be expected from just using the rotational speed of the tool bit and the force exerted by the feed cylinder. It is thought that the pulsing action of the pressurized hydraulic fluid provided by the hydraulic pump to the feed cylinder allows a more efficient and rapid cutting action by the drill bit.

The present invention has been described in relation to a preferred embodiment of the invention. It is to be realized that one of ordinary skill after reading the foregoing specification could make various alterations, substitutions of equivalents, and other changes without departing from the general concepts disclosed herein. For example, drilling assembly 12 can be used without clamp-up assembly 13 in other drilling operations requiring a compact, high pressure drilling unit without clamping capability. It is therefore intended that the scope of the Letters Patent granted hereon be limited only by the definition contained in the appended claims and equivalents thereof.

The embodiments of the invention in which an exclusive property of privilege are claimed is as follows:

1. A pneumatic-hydraulic drill unit, comprising:
   a casing having a forward end and a rear end and an aperture extending therethrough from said forward to said rear end;
   a hydraulically actuated feed cylinder, said feed cylinder being configured for placement within said aperture adjacent said rear end of said casing, said feed cylinder including a cylinder having a forward and a rear end and having a central bore that is substantially parallel to said aperture of said casing, said feed cylinder further including a piston and a rod that extends forwardly from said piston, said piston and rod configured for axial movement within said bore of said cylinder, said piston being movable between a retracted position wherein said piston is adjacent said rear end of said cylinder and an extended position wherein said piston is adjacent said forward end of said cylinder, said feed cylinder including an extend chamber rearward of said piston and a retract chamber forward of said piston, said rod having a bore extending through its entire length and continuing through said piston;
   a pneumatically actuated motor, said motor being configured to fit within said aperture of said casing forward of said feed cylinder, said motor having a forward end and a rear end, said rear end of said motor being affixed to said forward end of said rod of said feed cylinder, said bore of said rod being in fluid communication with said motor to supply pressurized air to said motor, said motor being movable between a rearmost position wherein said piston of said feed cylinder is in said retracted position and a forwardmost position wherein said piston of said feed cylinder is in said extended position;
   pneumatically actuated pump means for pressurizing hydraulic fluid for delivery to said feed cylinder;
   valve means for controlling the actuation of said drill unit;
   first circuit means for supplying air from a source of pressurized air to said bore of said rod, to said pump means, and to said valve means, said first circuit means including means for supplying air to said pump means at times during which air is not being supplied to said bore of said rod; and
   second circuit means for supplying pressurized hydraulic fluid to said feed cylinder and to said valve means.

2. The drill unit of claim 1, wherein said pump means includes:
   a pressure intensifying, pneumatically actuated hydraulic pump affixed to said casing, said pump including a pump housing having a cavity therein, said cavity having a longitudinal axis oriented parallel to a longitudinal axis of said casing, said hydraulic pump including a piston member, said piston member having a pneumatic piston with first and second sides, said piston member including first and second hydraulic pistons extending from said first and second sides of said pneumatic piston, respectively, said pneumatic piston having a larger diameter than said first and second hydraulic pistons, said cavity configured to receive said piston member for reciprocating movement therein along said longitudinal axis, said cavity having a pneumatic chamber in which said pneumatic piston reciprocates and first and second hydraulic chambers in which said first and second hydraulic pistons, respectively, reciprocate.

3. The drill unit of claim 2, wherein said valve means includes:
   a trigger valve, said trigger valve positioned in said first circuit means between said source of pressurized air and said bore of said rod, said trigger valve being actuatable between a closed and an open position, said trigger valve configured to block the passage of air when said valve is in the closed position and to allow the passage of air therethrough when in the open position;
   a four-way, two-position frequency generator, said frequency generator positioned in said first circuit means between said source of pressurized air and said hydraulic pump, said frequency generator having a valve member movable between a first and a second position, said frequency generator being configured to supply air to said first side of said pneumatic piston and exhaust air from said second side of said pneumatic piston when said valve member is in said first position, said frequency generator being configured to supply air to the second side of said pneumatic piston and exhaust air from said first side of said pneumatic piston when said valve member is in said second position, said valve member being connected to said piston member of said pump means to move said valve member between said first and second positions when said piston member reciprocates within said pump housing;

a retract valve, said retract valve mounted in said forward end of said casing to contact said forward end of said motor when said motor is in said forwardmost position, said retract valve configured to release air to the atmosphere when contacted by said motor;

a four-way, two-position hydraulic valve, said hydraulic valve positioned in said second circuit means between said feed cylinder and said hydraulic pump, said hydraulic valve being actuatable between a first position wherein pressurized hydraulic fluid is supplied to said retract chamber of said feed cylinder causing said piston to move to said retracted position and a second position wherein pressurized hydraulic fluid is supplied to said extend chamber of said feed cylinder to cause said piston to move to said extended position, said hydraulic valve having an air actuated pilot configured to actuate said hydraulic valve to move from said first to said second position when pressurized air is supplied to said pilot, said hydraulic valve configured to return to said first position when pressurized air is released from said pilot, said pilot being in fluid communication with said retract valve;

pulse valve means for transmitting a pulse of pressurized air to said retract valve and said pilot of said hydraulic valve, said pulse valve means including a pulse valve positioned in said first circuit means between said trigger valve and said retract valve and said pilot of said hydraulic valve, said pulse valve being actuatable between a first position wherein said retract valve and said pilot of said hydraulic valve are in fluid communication with said trigger valve and a second position wherein said retract valve and said pilot of said hydraulic valve are isolated from said trigger valve, said pulse valve including a first pilot configured to move said valve into said first position when said trigger valve is actuated, said pulse valve including a second pilot configured to move said pulse valve into said second position, said pulse valve means further including means for actuating said second pilot a set time interval after said trigger valve has been actuated.

4. The drill unit of claim 3, further comprising:
clamp means for clamping said drill unit to a workpiece, said clamp means including a hydraulically actuated clamp cylinder in fluid communication with said second circuit means, said clamp cylinder being mounted adjacent said casing of said drill unit, said clamp means further including a draw rod actuated by said clamp cylinder and extending forwardly therefrom, said clamp means also including a collet attached to the forward end of said draw rod, said collet extending forwardly beyond the forward end of said casing.

5. The drill unit of claim 4, further comprising:
feed control means for controlling the rate at which said piston of said feed cylinder moves from said retracted to said extended position.

6. The drill unit of claim 5, wherein the valve means further includes:

sequence valve means for controlling the flow of hydraulic fluid from said hydraulic valve to said feed cylinder.

7. The drill unit of claim 6, wherein the sequence valve means includes:
a sequence valve positioned in said second circuit means between said hydraulic valve and said extend chamber of said feed cylinder, said sequence valve being actuatable between a first position wherein said hydraulic valve is not in fluid communication with said extend chamber and a second position wherein said hydraulic valve is in fluid communication with said extend chamber, said sequence valve including a spring pilot to hold said valve in said first position and a hydraulic pilot configured to move said sequence valve into said second position, said hydraulic pilot configured to actuate said sequence valve a set time interval after pressurized hydraulic fluid is supplied to said sequence valve.

8. The drill unit of claim 7, further comprising:
a pneumatic module, said pneumatic module containing said pulse valve means and being removably fastened to said casing.

9. The drill unit of claim 8, further comprising:
a hydraulic module, said hydraulic module containing said hydraulic valve, said feed control means, and said sequence valve, said hydraulic module being removably fastened to said casing and in abutment with said air logic module.

10. The drill unit of claim 9, further comprising:
a gear pack, said gear pack configured to fit within said cylindrical aperture of said housing forward of said motor, said gear pack having forward and rear ends, said rear end of said gear pack being connected to said forward end of said motor, said forward end of said gear pack being configured for the attachment of a tool bit thereto.

11. The drill unit of claim 6, further comprising:
a gear pack, said gear pack configured to fit within said cylindrical aperture of said housing forward of said motor, said gear pack having forward and rear ends, said rear end of said gear pack being connected to said forward end of said motor, said forward end of said gear pack being configured for the attachment of a tool bit thereto.

12. The drill unit of claim 1, further comprising:
clamp means for clamping said drill unit to a workpiece, said clamp means including a hydraulically actuated clamp cylinder in fluid communication with said second circuit means, said clamp cylinder being mounted adjacent said casing of said drill unit, said clamp means further including a draw rod actuated by said clamp cylinder and extending forwardly therefrom, said clamp means also including a collet attached to the forward end of said draw rod, said collet extending forwardly beyond the forward end of said casing.

13. The drill unit of claim 3, further comprising:
feed control means for controlling the rate at which said piston of said feed cylinder moves from said retracted to said extended position.

14. The drill unit of claim 13, wherein the valve means further includes:
sequence valve means for controlling the flow of hydraulic fluid from said hydraulic valve to said feed cylinder.

15. The drill unit of claim 14, wherein the sequence valve means includes:
 a sequence valve positioned in said second circuit means between said hydraulic valve and said extend chamber of said feed cylinder, said sequence valve being actuatable between a first position wherein said hydraulic valve is not in fluid communication with said extend chamber and a second position wherein said hydraulic valve is in fluid communication with said extend chamber, said sequence valve including a spring pilot to hold said valve in said first position and a hydraulic pilot configured to move said sequence valve into said second position, said hydraulic pilot configured to actuate said sequence valve a set time interval after pressurized hydraulic fluid is supplied to said sequence valve.

16. The drill unit of claim 15, further comprising:
 a pneumatic module, said pneumatic module containing said pulse valve means and being removably fastened to said casing.

17. The drill unit of claim 16, further comprising:
 a hydraulic module, said hydraulic module containing said hydraulic valve, said feed control means, and said sequence valve, said hydraulic module being removably fastened to said casing and in abutment with said air logic module.

18. The drill unit of claim 17, further comprising:
 a gear pack, said gear pack configured to fit within said cylindrical aperture of said housing forward of said motor, said gear pack having forward and rear ends, said rear end of said gear pack being connected to said forward end of said motor, said forward end of said gear pack being configured for the attachment of a tool bit thereto.

19. The drill unit of claim 14, further comprising:
 a gear pack, said gear pack configured to fit within said cylindrical aperture of said housing forward of said motor, said gear pack having forward and rear ends, said rear end of said gear pack being connected to said forward end of said motor, said forward end of said gear pack being configured for the attachment of a tool bit thereto.

20. The drill unit of claim 1, wherein said valve means includes:
 a trigger valve, said trigger valve positioned in said first circuit means between said source of pressurized air and said bore of said rod, said trigger valve being actuatable between a closed and an open position, said trigger valve configured to block the passage of air when said valve is in the closed position and to allow the passage of air therethrough when in the open position;
 a four-way, two-position frequency generator, said frequency generator positioned in said first circuit means between said source of pressurized air and said hydraulic pump, said frequency generator having a valve member movable between a first and a second position, said frequency generator being configured to supply air to said first side of said pneumatic piston and exhaust air from said second side of said pneumatic piston when said valve member is in said first position, said frequency generator being configured to supply air to the second side of said pneumatic piston and exhaust air from said first side of said pneumatic piston when said valve member is in said second position, said valve member being connected to said piston member of said pump means to move said valve member between said first and second positions when said piston member reciprocates within said pump housing;
 a retract valve, said retract valve mounted in said forward end of said casing to contact said forward end of said motor when said motor is in said forwardmost position, said retract valve configured to release air to the atmosphere when contacted by said motor;
 a four-way, two-position hydraulic valve, said hydraulic valve positioned in said second circuit means between said feed cylinder and said hydraulic pump, said hydraulic valve being actuatable between a first position wherein pressurized hydraulic fluid is supplied to said retract chamber of said feed cylinder causing said piston to move to said retracted position and a second position wherein pressurized hydraulic fluid is supplied to said extend chamber of said feed cylinder to cause said piston to move to said extended position, said hydraulic valve having an air-actuated pilot configured to actuate said hydraulic valve to move from said first to said second position when pressurized air is supplied to said pilot, said hydraulic valve configured to return to said first position when pressurized air is released from said pilot, said pilot being in fluid communication with said retract valve; and
 pulse valve means for transmitting a pulse of pressurized air to said retract valve and said pilot of said hydraulic valve, said pulse valve means including a pulse valve positioned in said first circuit means between said trigger valve and said retract valve and said pilot of said hydraulic valve, said pulse valve being actuatable between a first position wherein said retract valve and said pilot of said hydraulic valve are in fluid communication with said trigger valve and a second position wherein said retract valve and said pilot of said hydraulic valve are isolated from said trigger valve, said pulse valve including a first pilot configured to move said pulse valve into said first position when said trigger valve is actuated, said pulse valve including a second pilot configured to move said pulse valve into said second position, said pulse valve means further including means for actuating said second pilot a set time interval after said trigger valve has been actuated.

21. The drill unit of claim 20, further comprising:
 feed control means for controlling the rate at which said piston of said feed cylinder moves from said retracted to said extended position.

22. The drill unit of claim 21, wherein the valve means further includes:
 sequence valve means for controlling the flow of hydraulic fluid from said hydraulic valve to said feed cylinder.

23. The drill unit of claim 22, wherein the sequence valve means includes:
 a sequence valve positioned in said second circuit means between said hydraulic valve and said extend chamber of said feed cylinder, said sequence valve being actuatable between a first position wherein said hydraulic valve is not in fluid communication with said extend chamber and a second position wherein said hydraulic valve is in fluid communication with said extend chamber, said sequence valve including a spring pilot to hold said valve in said first position and a hydraulic pilot configured to move said sequence valve into said second position, said hydraulic pilot configured to actuate said sequence valve a set time interval after pressurized hydraulic fluid is supplied to said sequence valve.

24. The drill unit of claim 23, further comprising: a pneumatic module, said pneumatic module containing said pulse valve means and being removably fastened to said casing.

25. The drill unit of claim 24, further comprising: a hydraulic module, said hydraulic module containing said hydraulic valve, said feed control means, and said sequence valve, said hydraulic module being removably fastened to said casing and in abutment with said air logic module.

* * * * *